(12) United States Patent
Nagahara et al.

(10) Patent No.: US 7,574,113 B2
(45) Date of Patent: Aug. 11, 2009

(54) VIDEO AND AUDIO DATA RECORDING APPARATUS, VIDEO AND AUDIO DATA RECORDING METHOD, VIDEO AND AUDIO DATA REPRODUCING APPARATUS, AND VIDEO AND AUDIO DATA REPRODUCING METHOD

(75) Inventors: Daizoh Nagahara, Tokyo (JP); Thomas Luther, Sunnyvale, CA (US); Hiroaki Eto, Tokyo (JP); Kanchan Ranade, Mountain View, CA (US); David Wang, Los Altos, CA (US); Tetsuya Yamamoto, Tokyo (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 942 days.

(21) Appl. No.: 10/408,709

(22) Filed: Apr. 7, 2003

(65) Prior Publication Data

US 2003/0231870 A1 Dec. 18, 2003

Related U.S. Application Data

(60) Provisional application No. 60/380,089, filed on May 6, 2002.

(51) Int. Cl.
*H04N 5/91* (2006.01)

(52) U.S. Cl. ........................................................ 386/98
(58) Field of Classification Search .................. 386/95, 386/128, 98, 125–126, 111–112
See application file for complete search history.

(56) References Cited

U.S. PATENT DOCUMENTS

| | | | | |
|---|---|---|---|---|
| 5,455,684 A | * | 10/1995 | Fujinami et al. | 386/111 |
| 6,266,483 B1 | * | 7/2001 | Okada et al. | 386/128 |
| 6,553,180 B1 | * | 4/2003 | Kikuchi et al. | 386/95 |
| 6,784,941 B1 | * | 8/2004 | Su et al. | 348/445 |

* cited by examiner

*Primary Examiner*—Thai Tran
*Assistant Examiner*—Tat Chi Chio
(74) *Attorney, Agent, or Firm*—Frommer Lawrence & Haug LLP; William S. Frommer

(57) ABSTRACT

Video data and audio data of multiplexed data are separated. Abstract video data is generated from the separated video data and abstract audio data is generated from the separated audio data. Then, the abstract video data and the abstract audio data are packed and a packed video and audio data management table is generated from packed video and audio data D2 and video and audio data synchronization information D3. The packed video and audio data management table comprehensively manages the packed video and audio data. Thus, data of various video formats, various audio formats and various multiplexing formats can be monistically managed.

19 Claims, 18 Drawing Sheets

| PACKED VIDEO AND AUDIO DATA # | REPRODUCTION LAPSE TIME | RECORDING POSITION | SIZE |
|---|---|---|---|
| #1 | 00:00:00.00 | SDA#100-105 | 378.236 |
| #2 | 00:00:00.15 | SDA#106-108 | 380.751 |
| #3 | 00:00:01.00 | SDA#109-114 | 375.629 |
| ..... | ..... | ..... | ..... |
| #N | 00:30:00.00 | SDA#896-900 | 379.572 |

FIG.9

| ABSTRACT RECORDING AREA | ACTUAL RECORDING POSITION | SIZE |
|---|---|---|
| SDA#1 | LBA0-511 | 262.144 |
| SDA#2 | LBA512-1023 | 262.144 |
| SDA#3 | LBA1024-2047 | 524.288 |
| ⋮ | ⋮ | ⋮ |
| SDA#N | LBA99998976-99999999 | 524.288 |

FIG. 16

VIDEO AND AUDIO DATA RECORDING APPARATUS, VIDEO AND AUDIO DATA RECORDING METHOD, VIDEO AND AUDIO DATA REPRODUCING APPARATUS, AND VIDEO AND AUDIO DATA REPRODUCING METHOD

This application claims priority of U.S. Provisional Patent Application No. 60/380089, filed on May 6, 2002, "DIGITAL AUDIO AND VIDEO DATA RECORDING AND/OR REPRODUCING APPARATUS AND METHOD", the entirety of which is incorporated by reference herein.

BACKGROUND OF THE INVENTION

1. Field of the Invention

This invention relates to an apparatus and method for recording and reproducing digital video and audio data, and particularly to a video and audio data recording apparatus, a video and audio data recording method, a video and audio data reproducing apparatus, and a video and audio data reproducing method that enable supporting multi-format without limiting a video data format, an audio data format and a format for multiplexing these formats.

2. Description of the Related Art

As more and more video and audio contents are transmitted in a digital format or distributed as packages, AV equipments for recording and reproducing these digital video and audio contents are being popularized. Recording media for such contents include magnetic disks, optical discs or magnetic tapes. Particularly a system with a randomly accessible recording medium not only records and reproduces video and audio contents but also often performs special reproduction utilizing its random accessibility. DVD players, DVD recorders and hard disk recorders are typical examples of such a system.

In order to realize special reproduction utilizing the random accessibility, it is necessary to not only record video and audio contents like a file handled on a personal computer but also provide a certain measure to analyze the digital video and audio data and manage the digital audio and video data using a necessary unit for realizing special reproduction. Practically, the above-described system has such a measure.

However, the format of and compression method for video and audio contents to be recorded are usually limited and a necessary measure to realize the above-described special reproduction or the like is constructed within the limited framework. As a result, limitation of video and audio contents, limitation of recording/reproduction processing methods for video and audio contents, and limitation of recording media are necessary and a single system matching these limitations must be constructed.

Although some of such systems accept input of plural video formats and plural audio formats, video and audio data are re-encoded to a dedicated format to which the systems are conformable. Even if the systems are conformable to plural formats, they are only conformable to specified plural formats. The re-encoding causes deterioration in image and sound quality, and the quality of inputted video and audio contents cannot be maintained when these contents are recorded.

In this manner, the conventional systems are only conformable to a specified video format, a specified audio format and a specified video and audio multiplexing format. To flexibly support other formats, separate AV equipments conformable to these formats must be prepared. This causes much inconvenience.

Even when plural formats are supported, if a re-encoding system is used, the problem of deterioration in original image quality arises.

SUMMARY OF THE INVENTION

Thus, in view of the foregoing status of the art, it is an object of the present invention to provide a video and audio data recording apparatus, a video and audio data recording method, a video and audio data reproducing apparatus, and a video and audio data reproducing method that are flexibly conformable to plural video formats, plural audio formats and plural multiplexing formats and support multi-format recording and reproduction without deteriorating the video and audio quality.

In order to achieve the above-described object, a video and audio data recording apparatus according to the present invention includes: recording starting means for starting recording of a video and audio source; attribute designating means for designating an attribute of a video and audio source to be recorded; synchronizing signal separating means for analyzing multiplexed data conformable to a multiplexing format of an inputted digital video and audio source and separating video data, audio data and a video and audio data synchronizing signal included therein; video abstract data generating means for generating data of abstracted video format from the video data; audio abstract data generating means for generating data of abstracted audio format from the audio data; packing means for packing the abstracted video and audio data as recording data; packed video and audio data management table generating means for generating a packed video and audio data management table for comprehensively managing the packed video and audio data and the video and audio data synchronizing information, from the packed video and audio data and the video and audio data synchronizing information; recording medium management table generating means for generating a recording medium management table for identifying each video and audio source recorded on a recording medium; and table recording means for recording the packed video and audio data and the management tables as a group.

In order to achieve the above-described object, a video and audio data recording method according to the present invention includes: a recording step of starting recording of a video and audio source; a step of designating an attribute of a video and audio source to be recorded; a step of analyzing multiplexed data conformable to a multiplexing format of an inputted digital video and audio source and separating video data, audio data and a video and audio data synchronizing information included therein; a step of generating data of abstracted video format from the video data; a step of generating data of abstracted audio format from the audio data; a step of generating a packed video and audio data management table for comprehensively managing packed video and audio data and the video and audio data synchronizing information, from the packed video and audio data and the video and audio data synchronizing information; a step of generating a recording medium management table for identifying each video and audio source recorded on a recording medium; and a step of recording the packed video and audio data and the management tables as a group.

In order to achieve the above-described object, a video and audio data reproducing apparatus according to the present invention includes: selecting means for inputting a selected video and audio content; reproducing method designating means for designating a reproducing method for the selected video and audio content; multiplexing method designating means for designating a multiplexing method for the selected video and audio content; recording medium management table acquiring means for reading out a recording medium management table having stored therein a time presenting the video and audio data and a recording position of a packed video and audio data management table having stored therein a position on a recording medium where packed video and audio data is stored and its size; packed video and audio data management table acquiring means for reading out a packed video and audio data management table for the video and audio content in accordance with the information of the recording position of the packed video and audio data management table stored on the recording medium management table; packed data acquiring means for sequentially reading out the packed video and audio data from the packed video and audio data management table in accordance with the video and audio content reproducing method; unpacking means for unpacking the read-out packed video and audio data using video and audio data attribute information described on the packed video and audio data management table; and multiplexed data generating means for generating video and audio multiplexed data conformable to the designated video and audio content reproducing method and multiplexing format.

In order to achieve the above-described object, a video and audio data reproducing method according to the present invention includes: a step of inputting a selected video and audio content; a step of designating a reproducing method for the selected video and audio content; a step of designating a multiplexing method for the selected video and audio content; a step of reading out a recording medium management table having stored therein a time presenting the video and audio data and a recording position of a packed video and audio data management table having stored therein a position on a recording medium where packed video and audio data is stored and its size; a step of sequentially reading out the packed video and audio data in accordance with the information of the recording position of the packed video and audio data management table stored on the recording medium management table; a step of unpacking the read-out packed video and audio data using video and audio data attribute information described on the packed video and audio data management table; and a step of generating video and audio multiplexed data conformable to the designated video and audio content reproducing method and multiplexing format.

According to the present invention, as the measure to abstract the video and audio format of inputted video and audio data is provided, various video formats, various audio formats and various multiplexing formats can be flexibly supported and the video and audio data can be managed and recorded monistically.

Moreover, according to the present invention, since the table for managing abstracted video and audio data is provided in consideration of random accessibility, uniform special reproduction that does not vary depending on the video format and the audio format can be realized by utilizing the table. Since the processing related to special reproduction is performed within the reproducing apparatus, a system utilizing this reproducing apparatus can easily realize special reproduction.

Furthermore, according to the present invention, since the table for managing video and audio data with an abstracted form of recording medium is generated, various recording media can be used.

BRIEF DESCRIPTION OF THE DRAWINGS

FIG. 9 shows an exemplary packed video and audio data management table.

FIG. 16 shows an example of map information for recording area abstraction.

DESCRIPTION OF THE PREFERRED EMBODIMENTS

A video and audio data recording apparatus and a video and audio data reproducing apparatus to which the present invention is applied will now be described. A video and audio data recording apparatus 10 to which the present invention is applied is an apparatus for converting coded data to a format that is not dependent on CODEC (coding/decoding method) and recording the converted data a recording medium. In this embodiment, elimination of the processing dependent on CODEC is referred to as abstraction. The video and audio data recording apparatus 10 abstracts video data to generate video abstract data, abstracts audio data to generate audio abstract data, and then groups these generates abstract data into a predetermined data unit. In this case, the processing to group data of a certain format into a predetermined data unit is referred to as packing.

Figure 1:
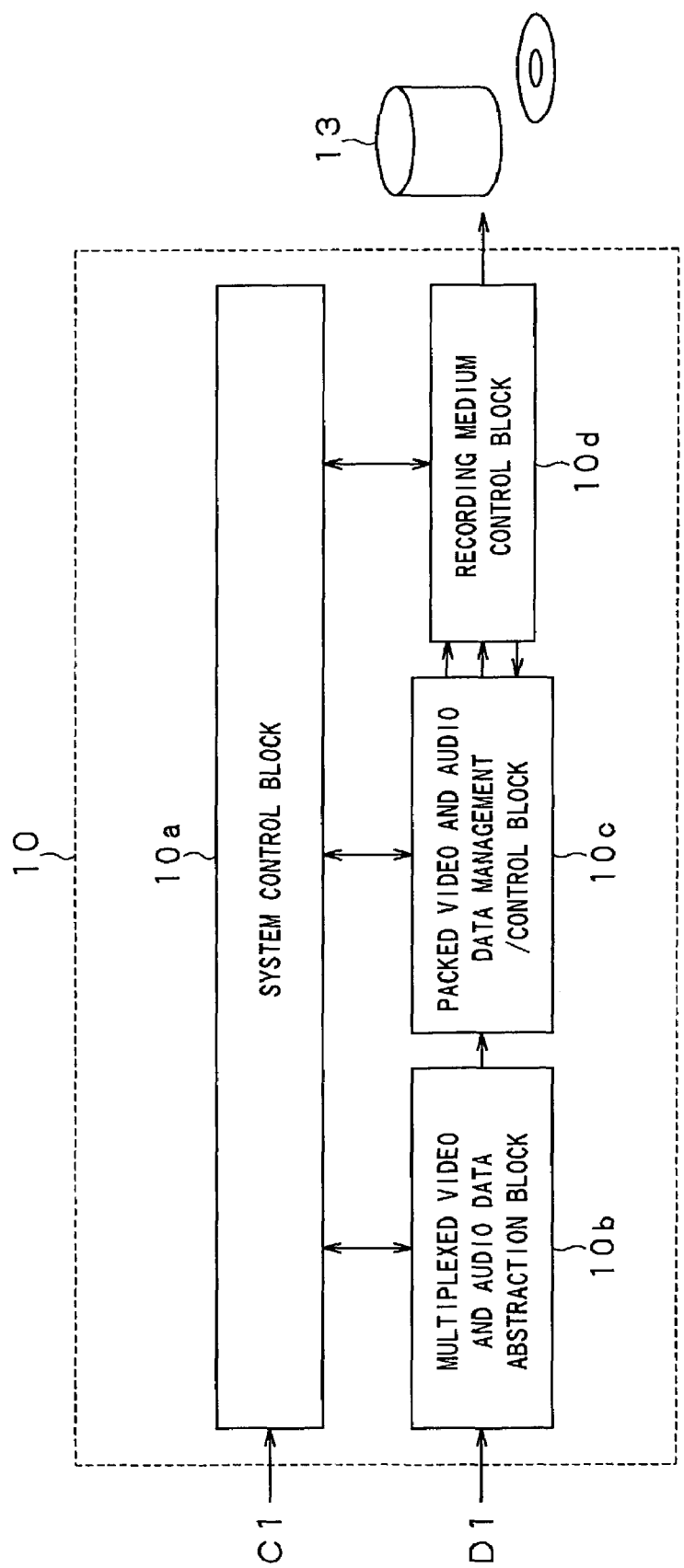
FIG. 1 is a block diagram showing an overall structure of a video and audio data recording apparatus.

FIG. 1 is a block diagram showing an overall structure of the video and audio data recording apparatus as a specific example of the present invention. The video and audio data recording apparatus as a subject of the present invention corresponds to a part surrounded by a dotted line.

The video and audio data recording apparatus 10 has a system control block 10a for controlling a block constituting the video and audio data recording apparatus, a multiplexed video and audio data abstraction block 10b for generating packed video and audio data, a packed video and audio data management control block 10c for generating a packed video and audio data management table and a recording medium management table, and a recording medium control block 10d for securing a recording area.

This video and audio data recording apparatus 10 functions as an interface situated between a digital tuner, an encoder or a network, which is a source (supply source) of video and audio contents to be recorded, and a recording medium. The video and audio data recording apparatus 10 is a recording apparatus capable of inputting a video and audio content from a content source and monistically managing the content as an abstracted file that is not dependent on the format of each content when storing the content to a recording medium 13.

Inputs to the video and audio data recording apparatus 10 include an external command C1 for controlling the video and audio data recording apparatus 10 and an input from a video and audio source D1 to be recorded. The external command C1 may be a command for starting recording, a command for transmitting an attribute P1 of the video and audio source to be recorded and the like. The video and audio source D1 is equivalent to a digital tuner, an encoder or a network, as described above. An input signal from the video and audio source D1 is, for example, an MPEG-2 transport stream or a DV stream. The video and audio source D1 may include not only multiplexed video and audio data but also video data alone or audio data alone.

The external command C1 is inputted to the system control block 10a of the video and audio data recording apparatus. The system control block 10a is a block for controlling this recording apparatus as a whole. The system control block 10a is, for example, an MPU. When a recording starting command is received, a multiplexed video and audio source D1 is inputted to the video and audio data recording apparatus 10. The input side of the video and audio source D1 and the apparatus side for controlling recording are completely separated in order to enable application of this video and audio data recording apparatus to any system that requires a function to record the video and audio source D1. The physical form and protocol for transmitting the external command C1, the video and audio source attribute P1 and the video and audio source D1 are not particularly limited.

After receiving a recording starting command T1 inputted from outside, the system control block 10a outputs a recording starting signal to the multiplexed video and audio data abstraction block 10b, the packed video and audio data management control block 10c and the recording medium control block 10d to start recording the inputted video and audio source D1. On receiving the signal, the respective blocks carry out preparation (initialization) for starting recording.

Next, the procedures for recording the inputted video and audio source D1 will be described in order.

Figure 2:
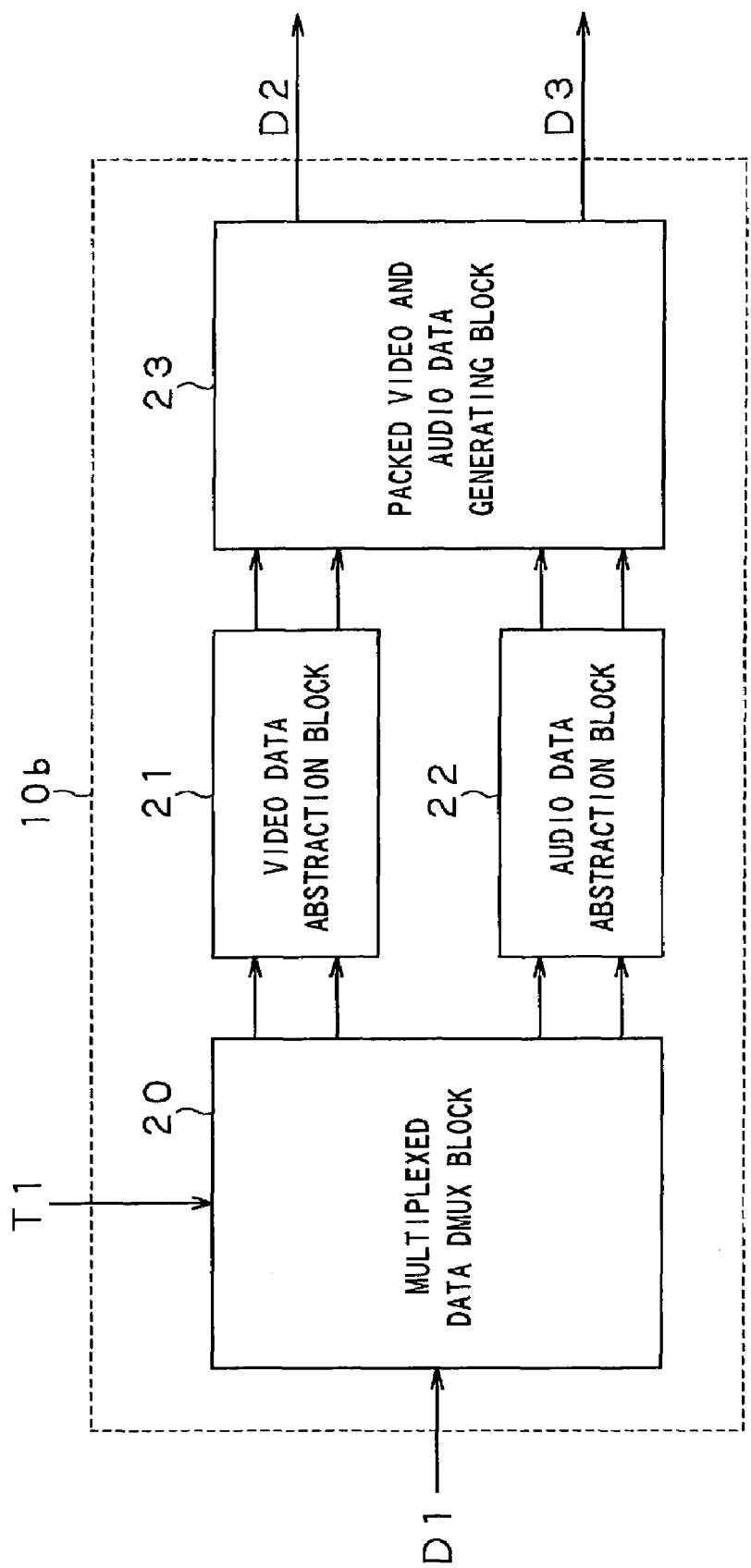
FIG. 2 is a block diagram showing an internal structure of a multiplexed video and audio data abstraction block.

FIG. 2 is a more detailed block diagram showing an internal structure of the multiplexed video and audio data abstraction block 10b.

The multiplexed video and audio data abstraction block 10b has a multiplexed data DMUX block 20 for demultiplexing the video data and the audio data, a video data abstraction block 21 for generating abstract video data, an audio data abstraction block 22 for generating abstract audio data, and a packed video and audio data D2 generating block 23 for generating packed video and audio data D2.

Information for identifying a multiplexing format and a control code for demultiplexing are stored in the multiplexed data DMUX block 20. The multiplexed data DMUX block 20 specifies the coding format of the inputted video and audio source D1 and demultiplexes the video data and audio data of the inputted video and audio source D1 in accordance with this control code.

The multiplexed data DMUX block 20 has already recognized what multiplexing format is inputted, from the external command C1. The multiplexed data DMUX block 20 judges whether or not the multiplexing format of the inputted video and audio source D1 is equal to the multiplexing format recognized from the external command C1.

The multiplexed data DMUX block 20 checks that the video and audio source D1 has a value proper to the multiplexing format, and thus specifies the multiplexing format. The control code in the multiplexed data DMUX block 20 stores information of what value is used as an index. This information includes byte position at which checking is to be started (relative position from the leading end of a stream), the number of bytes used for checking, field value and the like. The control code in the multiplexed data DMUX block 20 also stores a code for dealing with a failure in value detection. This code causes the multiplexed data DMUX block 20 to execute the processing to scan and search until the value is detected or to send it back as an error.

The multiplexing format specifying method in the multiplexed data DMUX block 20 will now be specifically described. In the case the video and audio source D1 has been coded by the MPEG system, a proper field value exists in a header of a packet constituting the video and audio source D1. For example, a proper field value "pack_start_code" exists in a pack header of an MPEG program stream, and a proper field value "sync_byte" exists in a pack header of an MPEG transform stream. Referring to this field value, the multiplexed data DMUX block 20 specifies that the video and audio source D1 is a program stream or a transport stream. A program stream and a transport stream are MPEG system streams. Therefore, when the video and audio source D1 is a program stream or a transport stream, the multiplexed data DMUX block 20 can specify that the multiplexing format of the video and audio source D1 is the MPEG video coding format. Proper filed values other than the above-described values may exist. By combining these field values and checking the coding format, it is possible to avoid a checking error due to coincidence of field value.

The multiplexed data DMUX block 20 also specifies multiplexing formats other the MPEG system, for example, DV-AVI and the like. Also in the case of specifying the multiplexing formats other than the MPEG system, the multiplexed data DMUX block 20 refers to the proper field value or direct identification information of the video and audio source D1.

The multiplexed data DMUX block 20 stores necessary microcodes for specifying every multiplexing format and abstracting the format. The external command C1 performs loading of the microcode for specifying the multiplexing format to the multiplexed data DMUX block 20. The multiplexed data DMUX block 20 can support a different multiplexing format by replacing the microcode. Even when simultaneously supporting plural multiplexing formats, the multiplexed data DMUX block 20 can use a microcode enabling such control. By thus causing the external command C1 to have a measure to download microcodes, it is possible to flexibly support various multiplexing formats without modifying the hardware.

Moreover, the multiplexed data DMUX block 20 stores necessary microcodes for specifying the multiplexing formats and abstracting the format in an HDD (hard disk drive) or a flash ROM (read-only memory) having a sufficient capacity. This is for the purpose of avoiding shortage of resources (microsize and the like) of the multiplexed data DMUX block 20 due to increase of multiplexing formats to be specified, and facilitating extension.

A multiplexing format usually has time information for synchronizing video data and audio data or a certain measure for synchronization based on at least some rules. For example, in the case of an MPEG-2 transport stream, PCR (program clock reference) is included as a reference clock, and on the basis of this reference clock, PTS (presentation time stamp) by certain unit is included as the time when reproduction of video data and audio data is to be started. Even in the case of video-only data or audio-only data having no time information, the timing at which the video or audio data is to be reproduced can be calculated form the frame cycle, sampling frequency and the like. In any case, the time when video data and audio data are to be reproduced can be found.

In this manner, the multiplexed data DMUX block 20 functions to demultiplex multiplexed video and audio data in accordance with a certain multiplexing format and to transmit the video and audio data together with the time information of when the video and audio data are to be reproduced, by certain unit (by time stamp unit), to the video data abstraction block 21 and the audio data abstraction block 22 on the subsequent stage. For example, in the case of an MPEG-2 system stream, a data structure having time information is prepared in advance. A PES (packetized elementary stream) packet is equivalent to this. The data is transmitted by unit called PES packet to the subsequent stage.

The demultiplexed video data generated in the multiplexed data DMUX block 20, and the reproduction start time information and multiplexing format information related to the video data are outputted to the video data abstraction block 21. The demultiplexed audio data generated in the multiplexed data DMUX block 20 and the reproduction start time information related to the audio data are outputted to the audio data abstraction block 22. Data other than the video and audio data and the reproduction start time information is not outputted from the multiplexed data DMUX block 20.

In the case of supporting plural multiplexing formats, the multiplexing format of the video and audio source D1 to be inputted is designated in advance by the external command C1, thereby enabling identification of the format. Alternatively, a measure to identify the format can be provided in the multiplexed data DMUX block 20 itself. An example of the case of supporting plural multiplexing formats may be supporting of an MPEG-2 transport stream and an MPEG-2 program stream.

Figure 3:
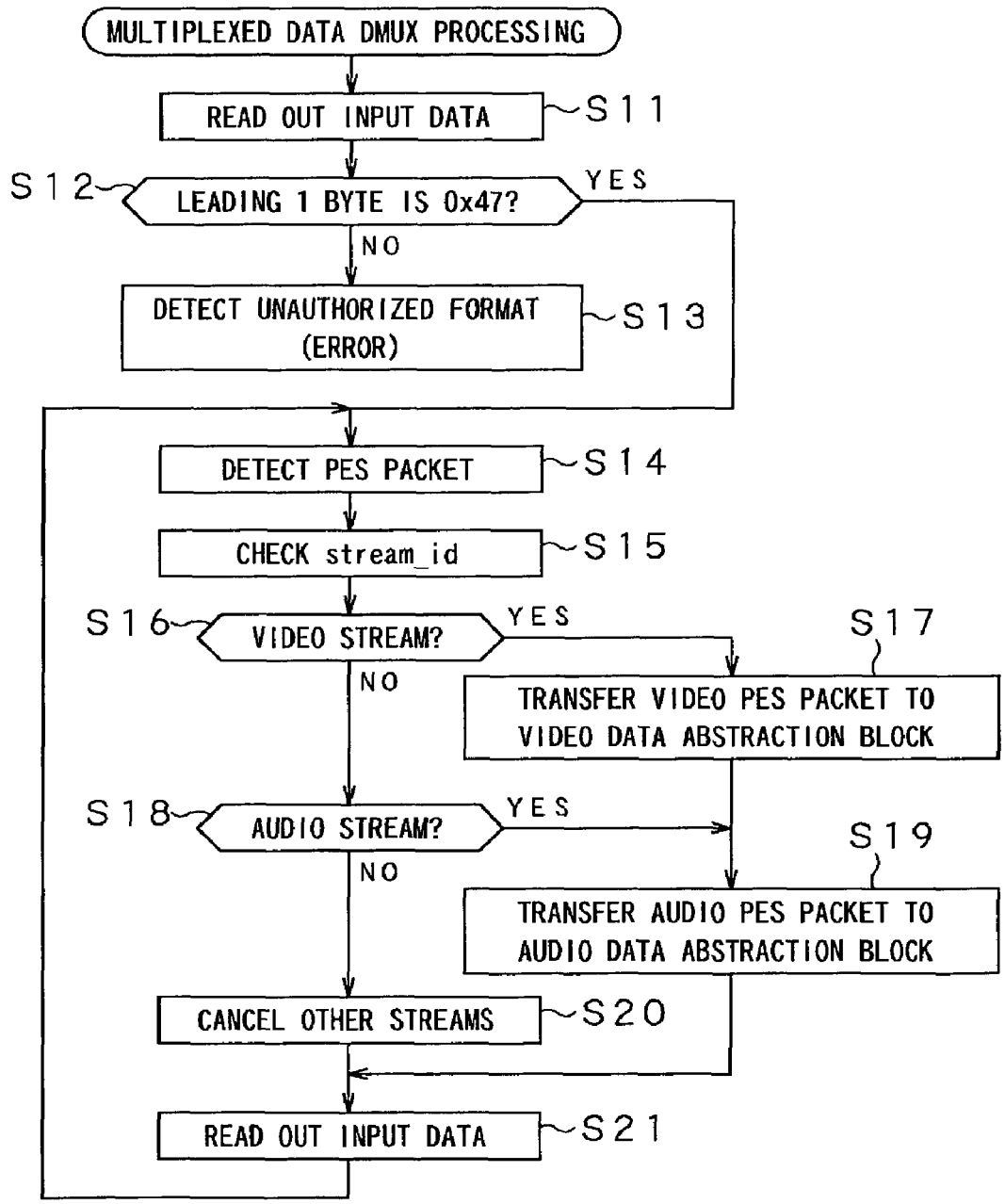
FIG. 3 is a flowchart showing processing procedures of multiplexed data DMUX processing.

The processing by the multiplexed data DMUX block 20 to specify a multiplexing format and demultiplex data will now be described with reference to the flowchart of FIG. 3.

In this case, the video data and audio data of the video and audio data source D1 and the external command C1 are inputted to the video and audio data recording apparatus 10. The multiplexed data DMUX block 20 reads out the video and audio source D1 inputted to the video and audio data recording apparatus 10. The external command C1 is inputted to the system control block 10*a*. The system control block 10*a* notifies the multiplexed data DMUX block 20 of the multiplexing format of the inputted video and audio source D1. In this example, the multiplexing format of the video and audio source D1 inputted to the video and audio data recording apparatus 10 is an MPEG transport stream (step S11).

The multiplexed data DMUX block 20 reads out a microcode for specifying an MPEG transport stream. The multiplexed data DMUX block 20 first checks whether the leading 1 byte of the video and audio source D1 is 0x47 or not, in accordance with the read-out microcode (step S12). If the leading 1 byte is 0x47 (YES at step S12), the multiplexed data DMUX block 20 specifies that the video and audio source D1 is an MPEG transport stream and starts video and audio demultiplexing processing. Then, the multiplexed data DMUX block 20 shifts to the precessing of step S14.

If the leading 1 byte of the video and audio source D1 is not 0x47 (NO at step S12), the multiplexed data DMUX block 20 specifies detection of an unauthorized format (step S13).

After specifying that the video and audio source D1 is an MPEG transport stream, the multiplexed data DMUX block 20 extracts a PES packet (step S14). Then, the multiplexed data DMUX block 20 checks the field value "stream_id" of a PES header (step S15). "stream_id" is the field value indicating whether the transport stream is a video stream or an audio stream. If the value of stream_id indicates a video stream (YES at step S16), the multiplexed data DMUX block 20 transfers the video PES packet to the video data abstraction block 21 (step S17) and reads out the next inputted video and audio source D1 (step S21). On the other hand, if the value of stream_id does not indicate a video stream (NO at step S16), the multiplexed data DMUX block 20 checks whether the value of stream_id indicates an audio stream or not (step S18). If it indicates an audio stream (YES at step S18), the multiplexed data DMUX block 20 transfers the audio PES packet to the audio data abstraction block 22 (step S19) and reads out the next inputted video and audio source D1 (step S21).

If the value of stream_id does not indicate an audio stream (NO at step S18), the multiplexed data DMUX block 20 cancels (step S20) and reads out the next inputted video and audio source D1 (step S21).

As described above, the multiplexed data DMUX block 20 specifies the multiplexing format under the control of the external command C1, and when the multiplexing format is specified, the multiplexed data DMUX block 20 demultiplexes the video data and the audio data in accordance with the procedure corresponding to the multiplexing format.

Next, the video data abstraction block 21 and the audio data abstraction block 22 shown in FIG. 2 will be specifically described.

The video data abstraction block 21 stores information for identifying the video coding format and a control code for separating the video data by video decoding unit. The video data abstraction block 21 identifies the video coding format in accordance with this information and separates the video data into decoding units of the identified video coding format.

The video data abstraction block 21 receives the video data demultiplexed by certain unit and the time information related to reproduction of the video data, from the multiplexed data DMUX block 20 on the previous stage. Since the data and information received by the video data abstraction block 21 have already been reduced to a multiplexing-canceled format, these data and information are processed by a method that is not dependent on the multiplexing format.

The audio data abstraction block 22 receives the audio data demultiplexed by certain unit and the time information related to reproduction of the audio data, from the multiplexed data DMUX block 20 on the previous stage. Since the data and information received by the audio data abstraction block 22 have already been reduced to a multiplexing-canceled format, these data and information can be processed by a method that is not dependent on the multiplexing format.

For example, whether an MPEG-2 transport stream or an MPEG-2 program stream, the stream has been reduced to a PES packet format and therefore information related to a system stream has already been eliminated. In short, the processing dependent on the multiplexing format is no longer necessary.

The video data abstraction block 21 specifies the coding format of the video data. The video data abstraction block 21 has already recognized what coding format is inputted, from the external command C1. The video data abstraction block 21 judges whether or not the coding format of the inputted video data is equal to the coding format recognized from the external command C1.

To specify the coding format, the video data abstraction block 21 confirms that the video data has a value proper to the coding format. The control code in the video data abstraction block 21 stores information of what value is used as an index for confirmation. This value may be the byte position to start checking (relative position from the leading end of a stream), the number of bytes used for checking, the field value or the like.

A specific example in which the video data abstraction block 21 specifies the coding format will now be described. In the case the multiplexed data DMUX block 20 has specified that the multiplexing format is MPEG, the video data abstraction block 21 specifies an MPEG video format as the coding format of the video data. In the case the multiplexing format is other than the MPEG system, the video data abstraction block 21 specifies the coding format of the video data with reference to the field value or the like.

The audio data abstraction block 22 specifies the coding format of the audio data. The audio data abstraction block 22 has already recognized what coding format is inputted, from the external command C1. The audio data abstraction block 22 judges whether or not the coding format of the inputted audio data is equal to the coding format recognized from the external command C1.

A specific example in which the audio data abstraction block 22 specifies the coding format will now be described. To specify the coding format, the audio data abstraction block 22 confirms that the audio data has a value proper to the coding format. The control code in the audio data abstraction block 22 stores information of what value is used as an index for confirmation. This value may be the byte position to start checking (relative position from the leading end of a stream), the number of bytes used for checking, the field value or the like.

In the case the multiplexed data DMUX block 20 has specified that the multiplexing format is the MPEG system, the audio data abstraction block 22 refers to the field value "stream_id" in the PES packet. With reference to this field value, the audio data abstraction block 22 specifies the coding format of the audio data from coding formats such as Dolby Digital, MPEG Audio, DTS, and LPCM. In the case the multiplexing format is other than the MPEG system, the audio data abstraction block 22 specifies the coding format of the audio data with reference to the field value or the like.

The video data abstraction block 21 and the audio data abstraction block 22 store necessary microcodes for specifying all coding formats and abstracting the coding formats. The external command C1 loads the microcodes for specifying the coding formats to the video data abstraction block 21 and the audio data abstraction block 22.

As the control inside the video data abstraction block 21 and the audio data abstraction block 22 is realized with the microcodes, it is possible to support different video and audio data formats by replacing the microcodes. Even when simultaneously supporting plural video and audio data formats, it is possible to support the formats by substituting a microcode that enables such control. By thus providing the external command C1 with the measure to download the microcodes, it is possible to flexible support various video and audio data formats without modifying the hardware.

In the case of supporting plural video and audio data formats, plural video and audio data formats of the inputted video and audio source D1 are designated in advance by the external command C1, thereby enabling identification of the formats. Alternatively, a measure to identify the formats may be provided in the video data abstraction block 21 and the audio data abstraction block 22 themselves. An example of the case of supporting plural video and audio data formats may be supporting of MPEG video and DV video as video data and MPEG audio and PCM audio as audio data.

Moreover, the video data abstraction block 21 and the audio data abstraction block 22 stores necessary microcodes for specifying coding formats and abstracting the formats, in an HDD, flash ROM or the like having a sufficient capacity. This is for the purpose of avoiding shortage of resources (microsize and the like) due to increase of multiplexing formats to be specified, and facilitating extension.

The format level specified by the multiplexed data DMUX block 20 and the format level specified by the video data abstraction block 21 and the audio data abstraction block 22 are completely separate. Therefore, the measure to store the microcodes can be constituted to replace only a necessary part of the microcodes, instead of replacing the entire microcodes stored in the DMUX block 20, the video data abstraction block 21 and the audio data abstraction block 22.

When a stream of a coding format that is not supported by any microcode is inputted, the multiplexed data DMUX block 20, the video data abstraction block 21 and the audio data abstraction block 22 use two methods to deal with the case.

The first method is to reject recording of a stream of an unsupported coding format. In this method, a microcode for this coding format can be downloaded via a network to sequentially update supportable coding formats. The second method is to record an unsupported stream as a pack without separating the stream into units. In this method, the worst situation such that the stream cannot be recorded can be avoided, though a data structure for special reproduction or editing cannot be generated.

For video data and audio data, there are units for decoding. Only when all the data of a decoding unit of coded data are obtained, video frames and audio samples included in the unit can be decoded. The decoding unit varies depending on the coding format. For example, the decoding unit of MPEG video is 1 GOP (group of pictures) consisting of 15 video frames. Even if only data related to a specified frame (or field) is extracted from this GOP, the video frame (or field) cannot be reproduced from the extracted data alone.

Alternatively, since video data necessarily includes a key frame, frames from the key frame to the frame immediately before the next key frame can be handled as a decoding unit. With this unit, all the frame data included therein can be decoded. For example, in the case of MPEG video, a frame called I-frame is equivalent to a key frame. Audio data includes an audio frame and all the sample data included in that unit can be decoded. In any case, video data and audio data can be separated into decoding units, respectively.

Although GOPs and audio frames are decoding units in the case of the MPEG system as described above, one video frame is a decoding unit in other formats such as DV and Motion-JPEG. That is, in such a coding format, data can be decoded by each video frame (or field). In such a coding format, a data structure for managing a stream is added to each video frame. Therefore, in such a coding format, the size of the data structure larger than in the MPEG system, in which a data structure for managing a stream is added to each GOP, and therefore a larger storage area is used. As will be described later, by grouping several data coded in the same coding format and managing the data in a single data structure, it is possible to reduce the size of the data structure and decrease the storage area to be used.

The demultiplexed video data and the time information related to reproduction of the video data are abstracted by grouping the above-described decoding units into one unit, at the video data abstraction block 21. The reproduction start time (abstract video data time information) is added to the abstract video data and this abstract video data is outputted to the packed video and audio data generating block 23. For example, in the case of MPEG-2 video data, since a GOP is a decoding unit, GOP data is extracted from video PES packet data. The data and the time to start reproducing the leading I-frame of the GOP as abstract video data time information are collectively outputted to the packed video and audio data generating block 23 on the subsequent stage.

Meanwhile, the demultiplexed audio data and the time information related to reproduction of the audio data are abstracted by grouping the above-described decoding units into one unit, at the audio data abstraction block 22. The reproduction start time (abstract audio data time information) is added to the abstract audio data and this abstract audio data is outputted to the packed video and audio data generating block 23. For example, in the case of MPEG-2 audio data, since one audio frame is a decoding unit, audio frame data is extracted from audio PES packet data. The data and the time to start reproducing the audio frame as abstract audio data time information are collectively outputted to the packed video and audio data generating block 23 on the subsequent stage.

As the demultiplexed video and audio data are managed by decoding unit as described above, the video format and the audio format are abstracted and recording control can be performed in the subsequent processing in a uniform format that is not dependent on the video and audio formats.

The abstract video and audio data and the abstract video and audio data time information generated as described above are outputted to the packed video and audio data generating block 23. The packed video and audio data generating block 23 functions to convert the inputted video and audio data to a recording format prescribed in this invention. For any multiplexing format, video format and audio format, monistic management can be carried out by employing a recording format obtained by abstracting these formats.

Figure 4:
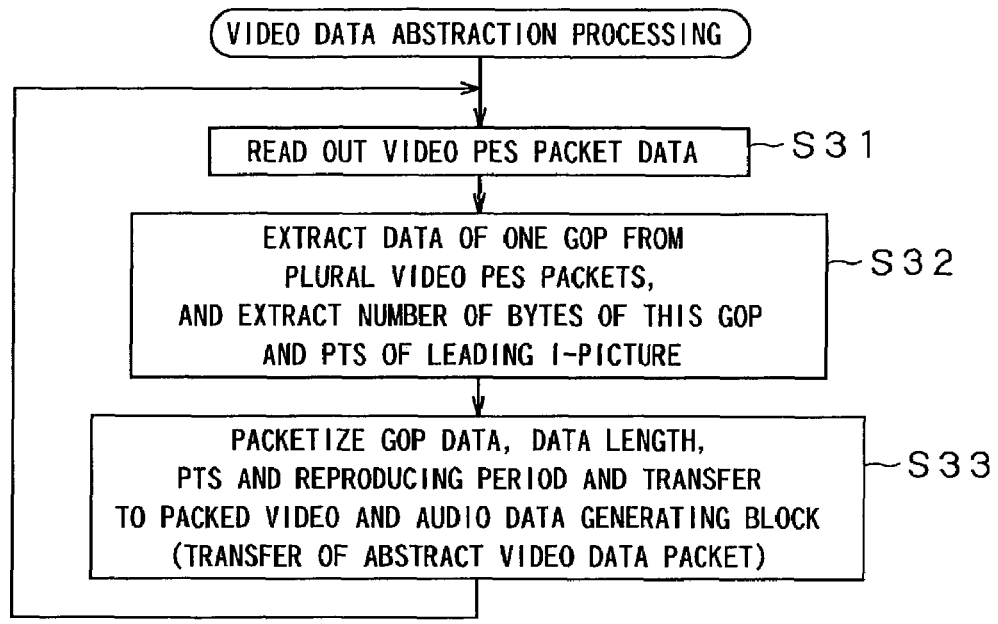
FIG. 4 is a flowchart showing processing procedures of video data abstraction processing.
Figure 5:
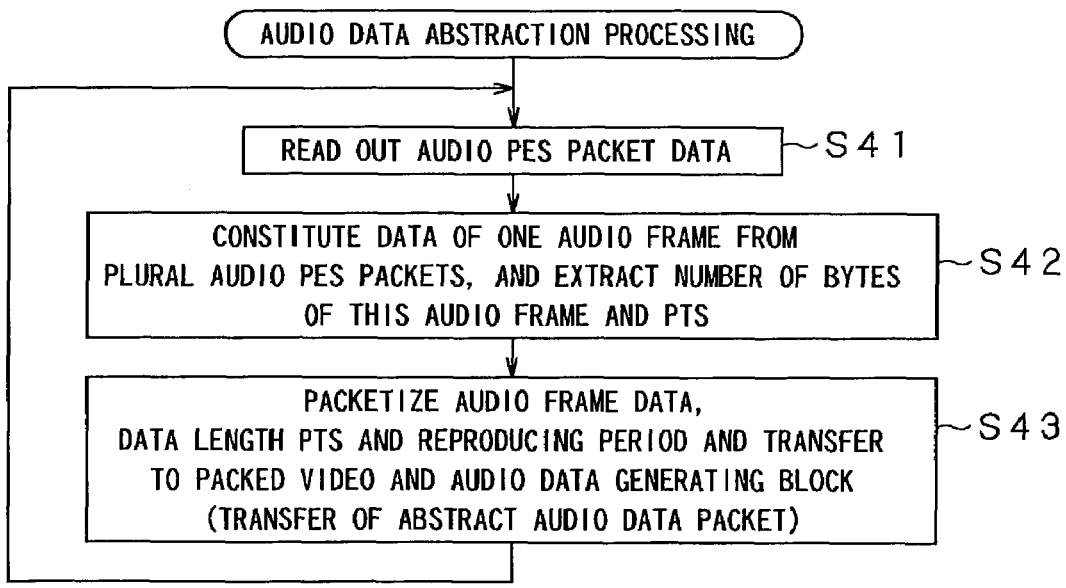
FIG. 5 is a flowchart showing processing procedures of audio data abstraction processing.

The above-described video data and audio data abstraction processing by the video data abstraction block 21 and the audio data abstraction block 22 will now be described in detail with reference to the flowcharts of FIGS. 4 and 5.

In the following description of the operation, an example in which image data of one GOP is used as a reference for packing will be described. In this example, it is assumed that video data and audio data have been coded in the MPEG coding format. The number of GOPs to be packed is not limited to the following example and an arbitrary number of GOPs can be packed. Moreover, audio data may be used as a reference, instead of image data.

First, the processing by the video data abstraction block 21 will be described. The video data abstraction block 21 reads out the video data outputted from the multiplexed data DMUX block 20 (step S31).

Next, the video data abstraction block 21 reads out PES packets until video data of one GOP is accumulated. After reading out video data of one GOP, the video data abstraction block 21 reads out the number of bytes of the video data and PTS of the leading I-picture. The video data abstraction block 21 also calculates a reproducing period. The reproducing period is the time required for reproducing one GOP. One frame of NTSC is equivalent to 3003 ticks. One frame of PAL is equivalent to 3600 ticks. The video data abstraction block 21 counts the number of ticks for each of the accumulated frames and calculates the reproducing period (step S32).

Next, the video data abstraction block 21 packetizes the video data, the number of bytes of the video data, PTS and the reproducing period, thus generating an abstract video data packet. The video data abstraction block 21 transfers the generated abstract video data packet to the packed video and audio data generating block.

In this manner, the video data abstraction block 21 generates an abstract video data packet including video data of one GOP. This generation procedure is for video data coded in the MPEG video coding format. The video data abstraction block 21 generates an abstract video data packet in accordance with the procedure suitable for each coding format.

The operation of the audio data abstraction block 22 will now be described. The audio data abstraction block 22 reads out the audio data outputted from the multiplexed data DMUX block 20 (step S41).

The audio data abstraction block 22 reads out an audio frame. The audio data abstraction block 22 read out audio PES until audio data of one audio frame is accumulated. The audio data abstraction block 22 reads out the number of bytes of one audio frame and PTS. The audio data abstraction block 22 also calculates a reproducing period based on the number of samples and the sampling frequency of the audio data. The reproducing period is the time required for reproducing audio data of one audio frame. For example, in the case of MPEG Audio Layer-II, it is assumed that one audio frame consists of 1152 samples and has been sampled at a sampling frequency of 48 kHz. Therefore, the reproducing period is 2160 ticks (step S42).

The audio data abstraction block 22 packetizes the accumulated audio data, the number of bytes of the audio data, PTS and the reproducing period, thus generating an abstract audio data packet. The audio data abstraction block 22 transfers the abstract audio data packet to the packed video and audio data generating block (step S43).

In this manner, the audio data abstraction block 22 generates an abstract audio data packet including audio data of one pack. This generation procedure is for audio data coded in the MPEG audio coding format. The audio data abstraction block 22 generates an abstract audio data packet in accordance with the procedure suitable for each coding format.

The packed video and audio data generating block 23 packs the abstract video data, the abstract audio data and the reproducing time information of these data into a data structure to be recorded. In packing the data, one of the inputted abstract video data and abstract audio data is used as a reference and the time information for reproducing the packed video and audio data is added thereto.

In the case of using the abstract video data as a reference (where the abstract video data contains video data of one video decoding unit), one pack is constituted to include audio data included in the time required for reproducing the video data. In the case of using the abstract audio data as a reference (where the abstract audio data contains audio data of one audio frame), one pack is constituted to include video data included in the time required for reproducing the audio data. Since the quantity of video data is generally much larger than the quantity of audio data, it is practical to pack the data using the abstract video data as a reference.

In the video and audio data recording apparatus 10, one recording unit can be an integral multiple of one decoding unit, instead of one decoding unit. While a pack is constituted using one video decoding unit or one audio frame unit in the above description, a pack may also be constituted using plural video decoding units or one audio frame unit. For example, one decoding unit of MPEG-2 video data is a GOP as described above. A set of plural such GOPs can be used as a reference to constitute a pack.

In the case of constituting one pack using a set of plural decoding units, the number of decoding units grouped for one pack can be designated by a command. The number of decoding units decides the accuracy of special reproduction and editing. Therefore, by designating the number of decoding units, it is possible to adapt the decoding units in accordance with the coding format or to compress the size of the data structure for special reproduction and editing.

In any case, the packed video and audio data generating block 23 uses a set of plural video or audio decoding units as a reference and packs (re-multiplexes) the data to include audio or video data included in the time required for reproducing the reference video or audio units. Moreover, the time to start reproducing the packed video and audio data is added thereto. By thus packing the data, it is possible to manage the video and audio data using an integral multiple of a decoding unit and hence perform random access control at the time of reproduction. Also synchronization of the video and audio data at the time of random access can be easily realized.

Figure 6:
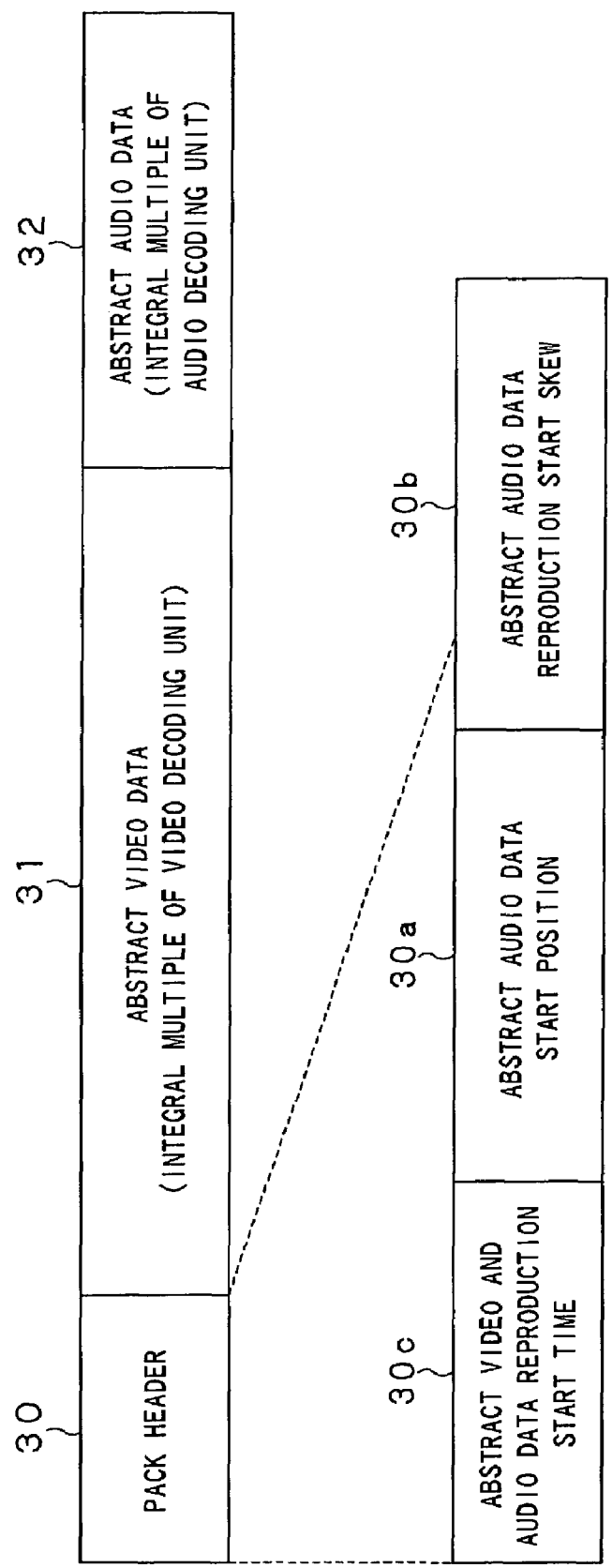
FIG. 6 is a block diagram showing a structure of packed video and audio data.

FIG. 6 shows an exemplary structure of the packed video and audio data D2. The packed video and audio data D2 includes a pack header 30, abstract video data 31 and abstract audio data 32. In the pack header 30, information showing the pack structure is described. In the case the pack is constituted using the abstract video data 31 as a reference, video data included in the time required for reproducing the abstract audio data is stored in the field of the abstract video data 31 in the pack. The arrangement order of the abstract video data 31 and the abstract audio data 32 is not prescribed.

In the case the pack is formed using the abstract video data as a reference, the pack header 30 includes an abstract audio data start position 30a, an abstract audio data reproduction start skew 30b, and an abstract video and audio data reproduction start time 30c.

The abstract audio data start position 30a is provided for the purpose of identifying the start position of the abstract audio data 32 in the pack. This enables support of the pack and abstract video data with a variable length.

The abstract audio data reproduction start skew 30b is provided for adjusting the timing to start reproducing the abstract video data and the abstract audio data in the pack. Generally, a video decoding unit (or its integral multiple) and an audio decoding unit (or its integral multiple) have different time boundaries. Therefore, in the case of selectively extracting and reproducing such packs, video and audio synchronization must be realized with a consistent time boundary. To this end, the abstract audio data reproduction start skew 30b is provided. Its field value starts audio reproduction prior to start of video reproduction. Alternatively, it is possible to perform control such that video reproduction is started first and audio reproduction is started after a while. For example, in the case the timing adjustment is counted by a clock of 90 kHz and its field value has a negative count value, audio reproduction is started prior to start of video reproduction by a time equivalent to (absolute value of count value)/90 [kHz]. Similarly, in the case the field value has a positive count value, audio reproduction is started after start of video reproduction by a time equivalent to (absolute value of count value)/90 [kHz].

The abstract video and audio data reproduction start time 30c includes a video data reproduction start time and an audio data reproduction start time. The video data reproduction start time and the audio data reproduction start time are expressed by the number of ticks, for example, using the 90-kHz clock used in the MPEG system.

The video data abstraction block 21 calculates the video data reproduction start time. When recording is started, the video data abstraction block 21 resets the video data reproduction start time to 0. The video data abstraction block 21 adds the video data reproduction start time in accordance with the number of packed frames.

For example, in the case of NTSC, since one frame has 29.97 Hz, the time is equivalent to 3003 ticks. In the case of PAL, since one frame has 25 Hz, the time is equivalent to 3600 ticks. While counting the number of frames, the video data abstraction block 21 adds 3003 (NTSC) ticks or 3600 (PAL) ticks in accordance with the type of frames, thus calculating the video data reproduction start time.

The audio data abstraction block 22 calculates the audio data reproduction start time. In the case of MPEG Audio Layer-II, one audio frame consisting of 1152 samples and an audio frame sampled at 48 kHz has 2160 ticks. When recording is started, the audio data abstraction block 22 resets the audio data reproduction start time to 0 and then adds the number of ticks for each audio frame, thus calculating the audio data reproduction start time.

Although a 27-MHZ clock is used for video, such high accuracy as 27 MHZ is not necessary for the recording/reproducing machine. Thus, 90 kHz is used as a basic clock. The clock frequency of 90 kHz satisfies the current CODEC, but designation of a tick reference clock frequency by a command may be made possible in consideration of the future extensibility.

As described above, the packed video and audio data generating block 23 generates the packed video and audio data D2.

Figure 7:
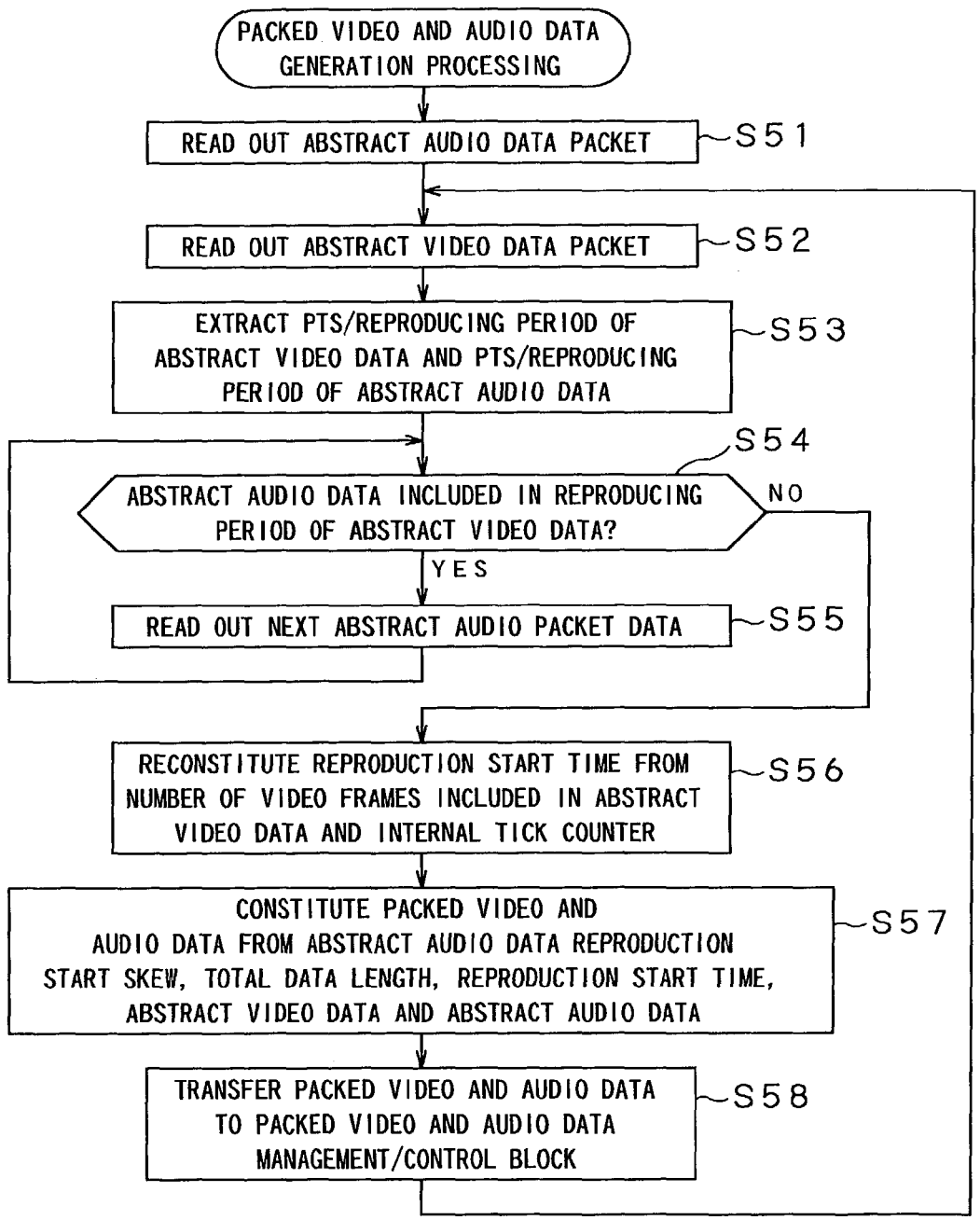
FIG. 7 is a flowchart showing processing procedure of packed video and audio data generation processing.

The data packing processing by the packed video and audio data generating block 23 will now be described in detail with reference to the flowchart of FIG. 7.

In the following description of the operation, an example in which image data of one GOP is used as a reference for packing will be described. In this example, it is assumed that video data and audio data have been coded in the MPEG coding format. The number of GOPs to be packed is not limited to the following example and an arbitrary number of GOPs can be packed. Moreover, audio data may be used as a reference, instead of image data.

The packed video and audio data generating block 23 reads out the abstract audio data packet outputted from the audio data abstraction block 22 (step S51). The packed video and audio data generating block 23 reads out the abstract video data outputted from the video data abstraction block 21 (step S52).

The packed video and audio data generating block 23 extracts PTS and the reproducing time of the abstract video data and PTS and the reproducing time of the abstract audio data (step S53). The packed video and audio data generating block 23 compares the reproducing time of the video data with the reproducing time of the audio data (step S54). If the reproducing time of the audio data is included in the reproducing time of the video data (YES at step S54), the packed video and audio data generating block 23 reads out the next abstract audio packet data (step S55). The packed video and audio data generating block 23 repeats the processing of steps S54 and S55. Then, the packed video and audio data generating block 23 reads out the audio data included in the time required for reproducing the video data of one GOP (NO at step S54) and shifts to the processing of step S56.

Next, the packed video and audio data generating block 23 calculates the abstract video and audio data reproduction start time. The method for calculating the abstract video and audio data reproduction start time is as described above (step S56).

The packed video and audio data generating block 23 calculates the abstract audio data reproduction start skew from the difference between the video data reproduction start time and the audio data reproduction start time. The packed video and audio data generating block 23 multiplexes the abstract audio data reproduction start skew, the total data length of the abstract video data and the abstract audio data, the abstract video and audio data reproduction start time, the abstract video data and the abstract audio data, thus generating the packed video and audio data D2 (step S57). The packed video and audio data generating block 23 transfers the packed video and audio data D2 to the packed video and audio data management control block (step S58).

In this manner, the multiplexed video and audio data abstraction block 10b abstracts the multiplexing format, the video format and the audio format, and packs (re-multiplexes) the data in a format that is not dependent on these formats, thus constituting recording data.

The packed video and audio data D2 generated in the multiplexed video and audio data abstraction block 10b is inputted to the packed video and audio data management control block 10c. The packed video and audio data management control block 10c generates a packed video and audio data management table D4 for managing the inputted packed video and audio data D2. The packed video and audio management control block 10c also generates a recording medium management table D5 for identifying contents recorded in a recording medium. The packed video and audio data D2 themselves and the above-mentioned management tables are outputted to the recording medium control block.

Figure 8:
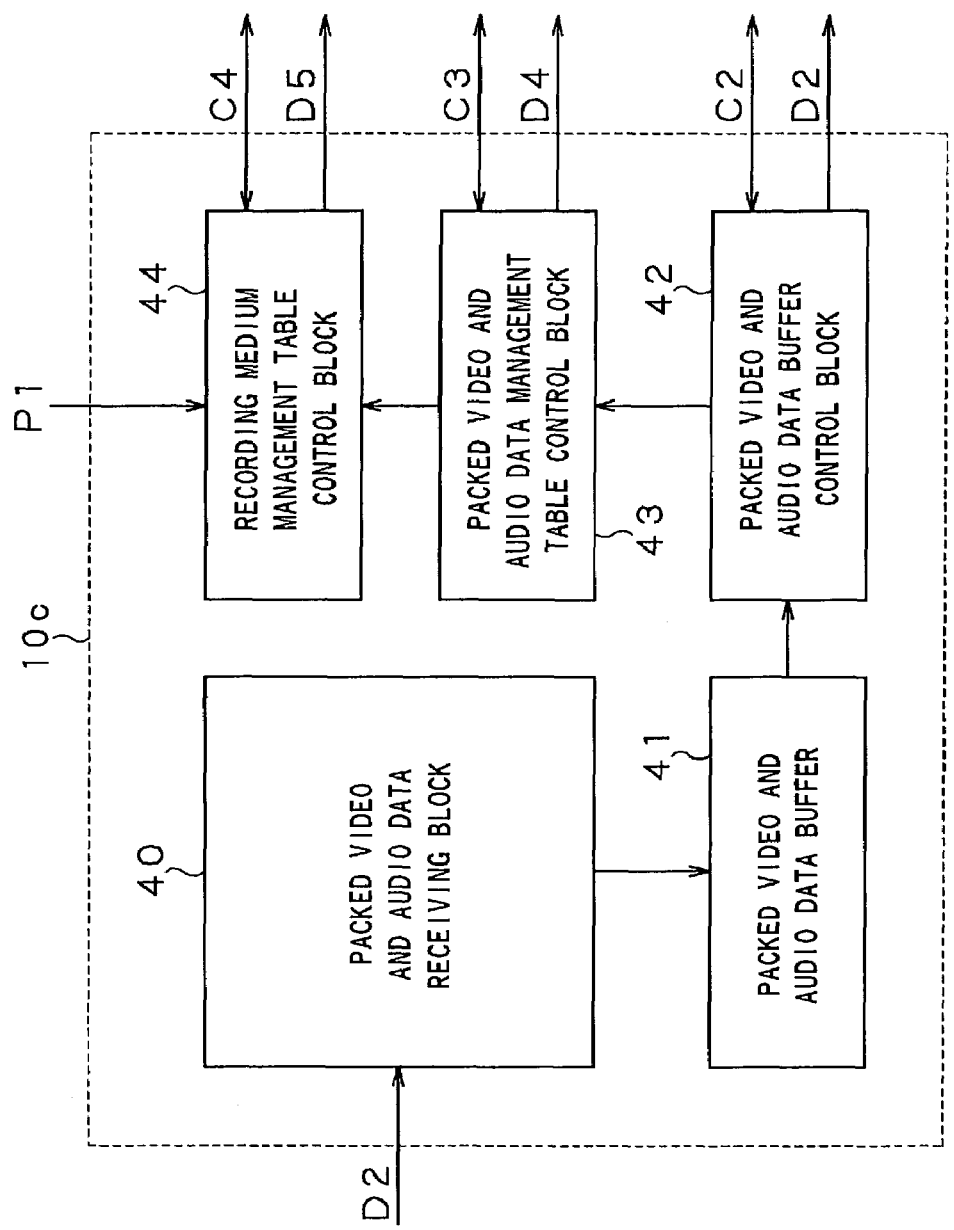
FIG. 8 is a block diagram showing an internal structure of a packed video and audio data management/control block at the time of recording.

FIG. 8 shows an internal structure of the packed video and audio data management control block 10c.

The packed video and audio data management control block 10c has a packed video and audio data receiving block 40 for receiving the packed video and audio data D2, a packed video and audio data buffer 41 for temporarily storing the received packed video and audio data D2, a packed video and audio data buffer control block 42 for, when necessary, reading out the data stored in the packed video and audio data buffer, a packed video and audio data management table control block 43 for generating a packed video and audio data management table, and a recording medium management table control block 44 for generating a recording medium management table.

The packed video and audio data D2 abstracted in the multiplexed video and audio data abstraction block 10b is first inputted to the packed video and audio data receiving block 40. The packed video and audio data receiving block 40 temporarily stores the inputted packed video and audio data D2 to the packed video and audio data buffer 41 in order to adjust recording units to the recording area.

The packed video and audio data buffer control block 42 monitors the packed video and audio data buffer 41, and when the packed video and audio data D2 exists in the buffer, the packed video and audio data buffer control block 42 outputs a recording area allocation request C2 with respect to a recording medium to the recording medium control block 10d. The packed video and audio data buffer control block 42 carries out alignment adjustment of the buffered packed video and audio data D2 to the allocated recording area and sequentially writes out the packed video and audio data D2 to the allocated recording area. When allocation of a new recording area is necessary, another packed video and audio data recording area allocation request C2 is outputted to the recording medium control block 10d.

The packed video and audio data management table control block 43 generates a sequence table on which the start time (reproduction lapse time), recording position and size of each packed video and audio data outputted from the packed video and audio data buffer control block 42 are described. This sequence table is referred to as packed video and audio data management table. FIG. 9 shows an exemplary packed video and audio data management table.

The packed video and audio data management table control block 43 also outputs a packed video and audio data management block recording area allocation request C3. It may be considered that the size of the packed video and audio management table exceeds the size allocated to one recording area allocation request, depending on the time length of the inputted video and audio source D1. In such a case, the packed video and audio data management table D4 that has already been generated is outputted to the allocated area and the next recording area allocation request C3 is outputted.

Figure 10:
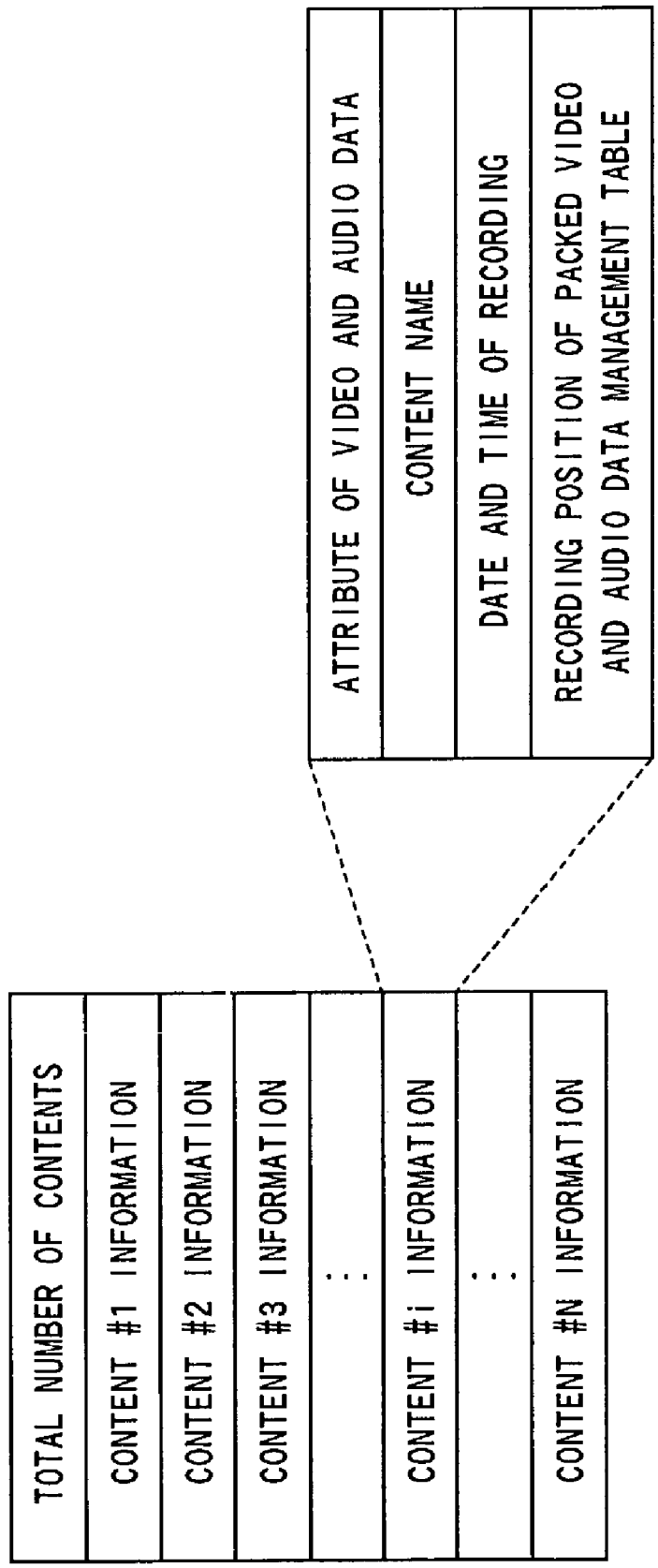
FIG. 10 shows an exemplary recording medium management table at the time of recording.

The recording medium management table control block 44 generates the recording medium management table D5. The recording medium management table D5 is a management table located at a higher level than the packed video and audio data management table. The recording medium management table D5 is a table for managing all the video and audio contents recorded in the recording medium. FIG. 10 shows the simplest example of this. For each of recorded contents, an attribute P1 of video and audio data of the content, the name of the content, the recording position of the packed video and audio data management table and the like are described. Information that is not included in the video and audio source D1 itself, for example, the attribute P1 of the video and audio data of the content and the name of the content, is acquired by the external command C1 via the system control block 10a. The recording medium management table control block 44 also outputs a recording medium management table recording area allocation request C4 to the recording medium control block 10d.

Since the total number of contents and the size of the packed video and audio data management table generally vary, the recording medium management table D5 has a variable length. The details of the recording medium management table D5 such as how to deal with this variable length are not particularly prescribed. What is important is to record information for identifying each content recorded on the recording medium so that one packed video and audio data management table of the information exists.

The operation of the packed video and audio data management control block 10c will now be described with reference to the flowcharts of FIGS. 11 to 14.

Figure 11:
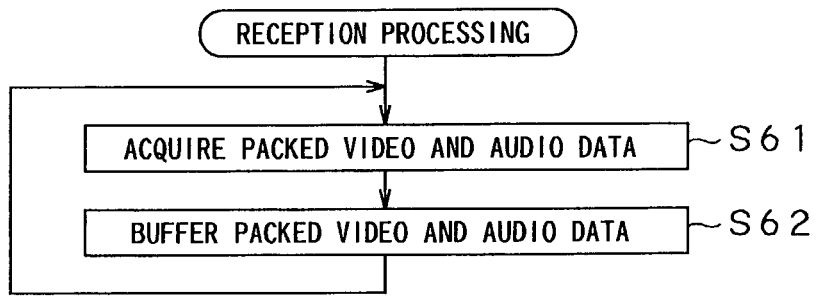
FIG. 11 is a flowchart showing processing procedures of reception processing.
Figure 12:
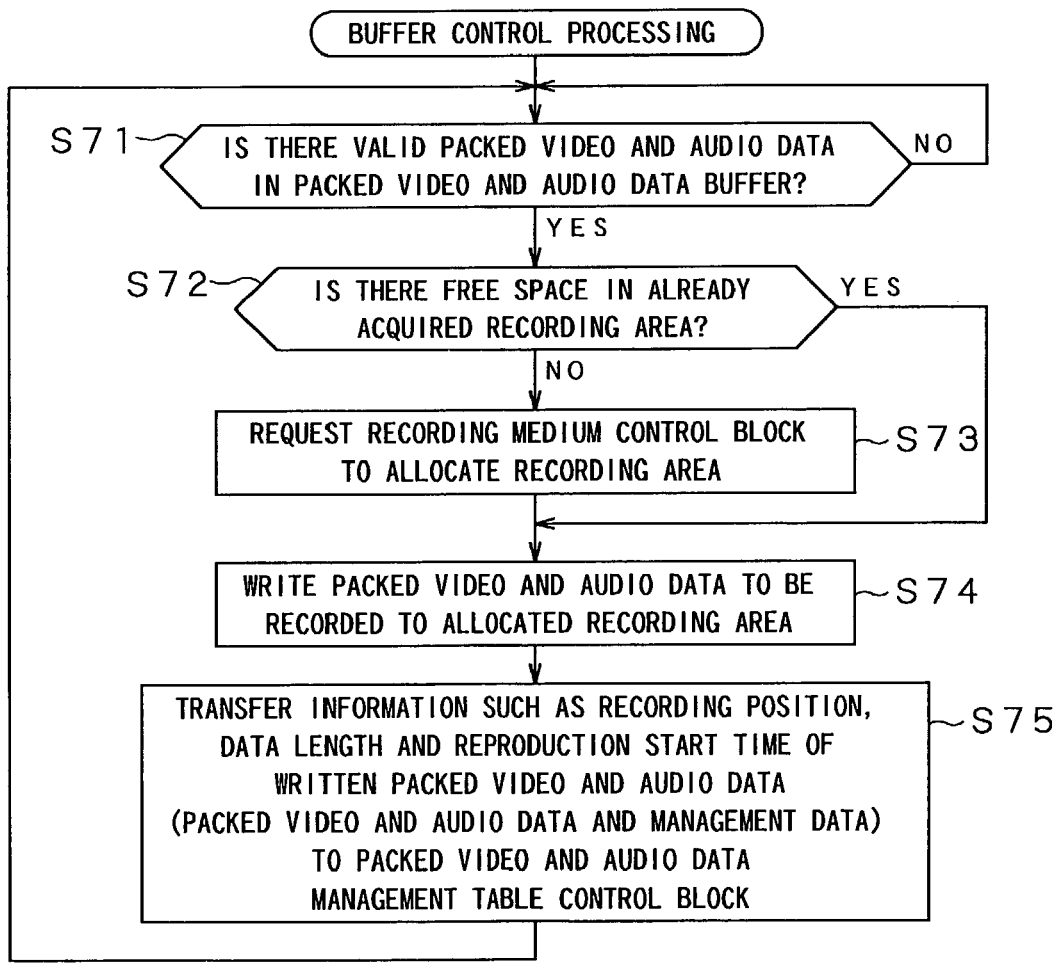
FIG. 12 is a flowchart showing processing procedures of buffer control processing.
Figure 13:
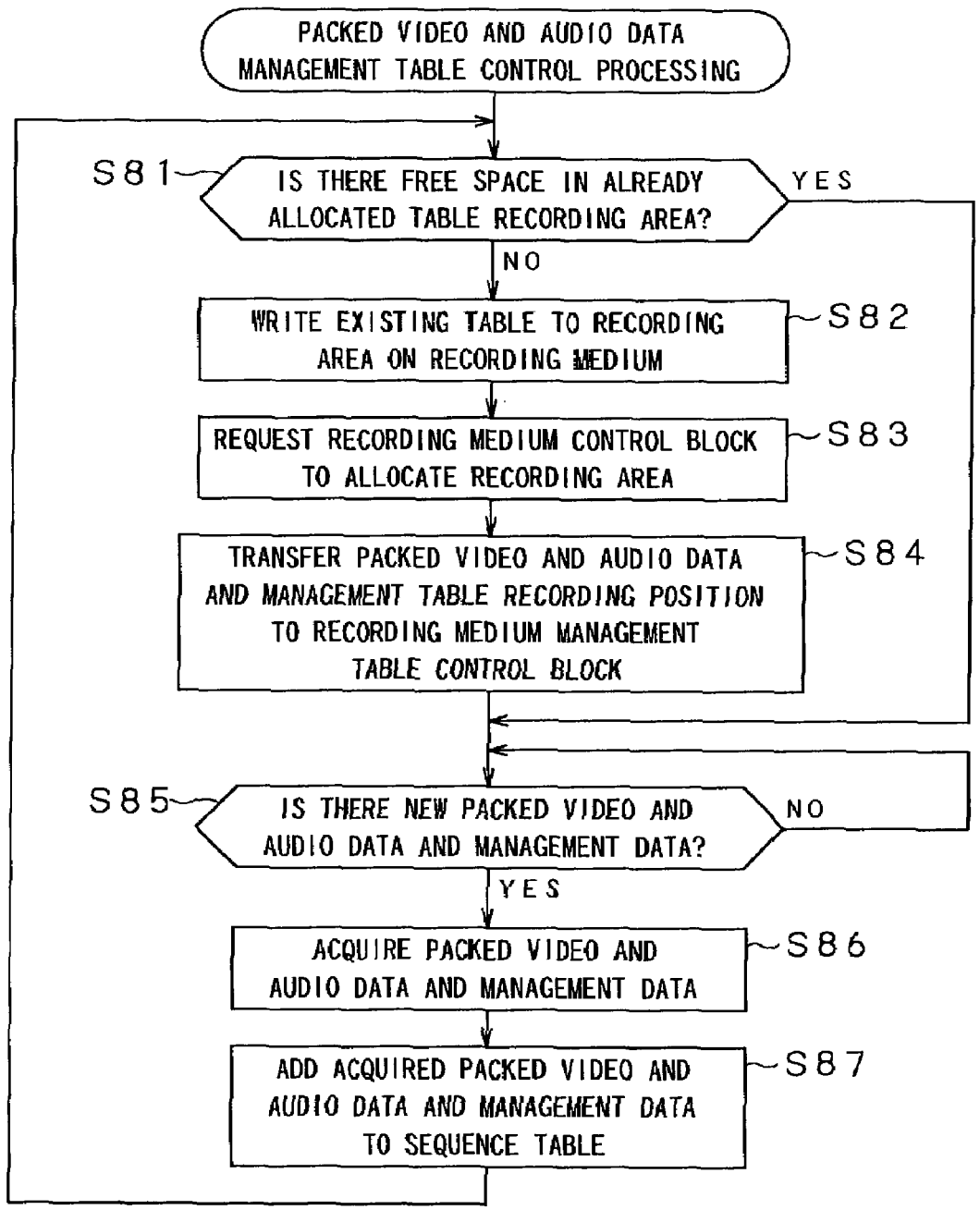
FIG. 13 is a flowchart showing processing procedures of packed video and audio data management table control processing.
Figure 14:
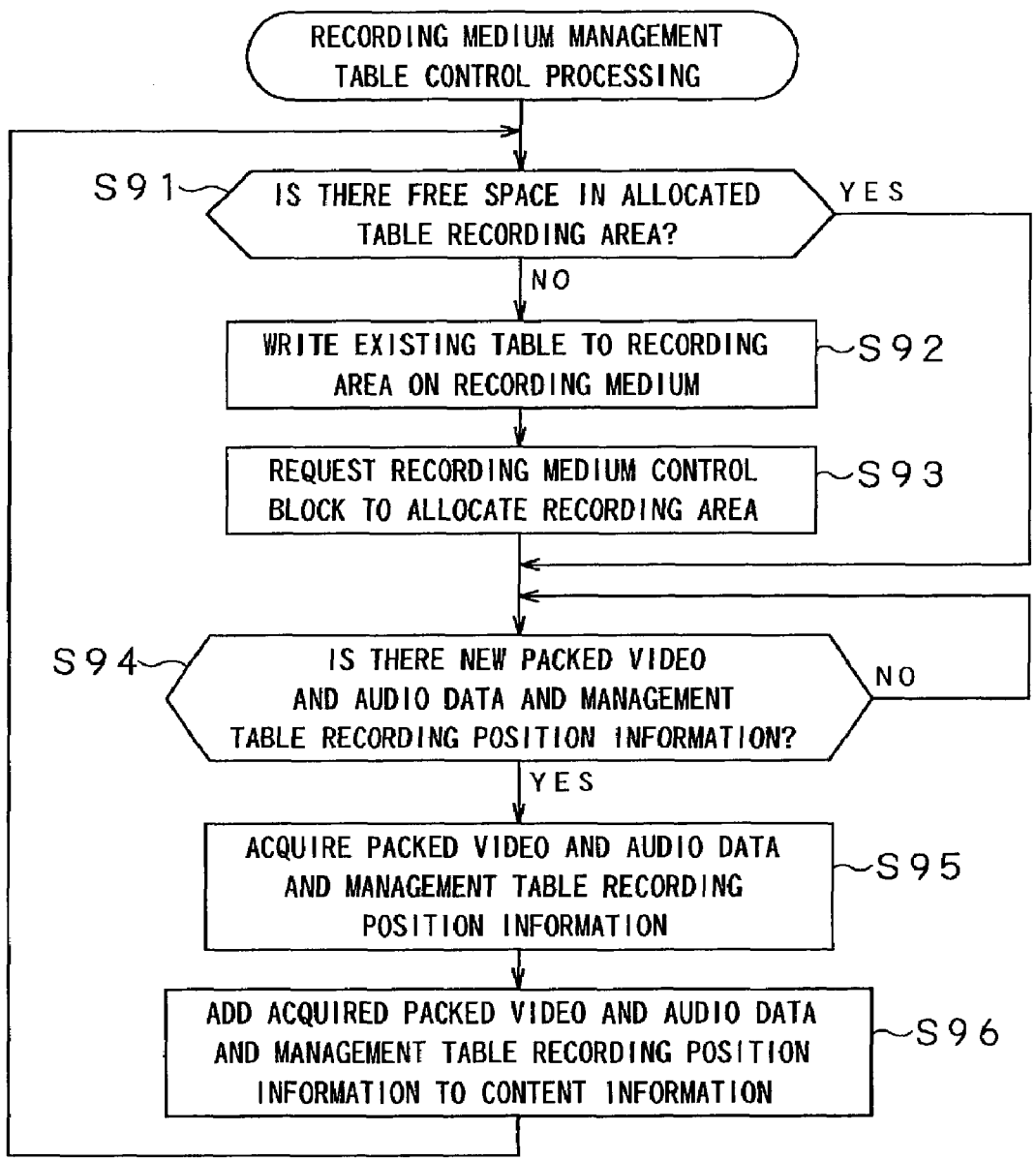
FIG. 14 is a flowchart showing processing procedures of recording medium management table control processing.

In the following description, the operation of the packed video and audio data management control block 10c will be divided into four kinds of processing, that is, reception processing, buffer control processing, packed video and audio data management table control processing, and recording medium management table control processing. FIG. 11 shows the reception processing. FIG. 12 shows the buffer control processing. FIG. 13 shows the packed video and audio data management table control processing. FIG. 14 shows the recording medium management table control processing.

First, the reception processing will be described with reference to FIG. 11. The reception processing is the processing by the packed video and audio data receiving block 40. The packed video and audio data receiving block 40 acquires the packed video and audio data D2 outputted from the multiplexed video and audio data abstraction block 10*b* (step S61). The packed video and audio data receiving block 40 temporarily stores the acquired packed video and audio data D2 to the packed video and audio data buffer 41 for adjusting recording units to the recording area (step S62).

The buffer control processing will now be described with reference to FIG. 12. The buffer control processing is the processing carried out by the packed video and audio data buffer control block 42. The packed video and audio data buffer control block 42 monitors the packed video and audio data buffer 41, and when the valid packed video and audio data D2 exists in the packed video and audio data buffer 41 (YES at step S71), the packed video and audio data buffer control block 42 checks whether or not there is a free space in the recording area that has already been allocated from the recording medium control block 10*d* (step S72). On the other hand, when the valid packed video and audio data D2 does not exist in the packed video and audio data buffer 41 at step S71 (NO at step S71), the packed video and audio data buffer control block 42 waits for input of the valid packed video and audio data D2 (step S71).

If it is judged that there is a free space in the already acquired recording area (YES at step S72), the packed video and audio data buffer control block 42 writes the packed video and audio data D2 to this recording area (step S74). On the other hand, if it is judged that there is no free space in the already acquired recording area (NO at step S72), the packed video and audio data buffer control block 42 outputs a packed video and audio data recording area allocation request C2 to the recording medium control block 10*d* (step S73) and shifts to the processing of step S74.

When a recording area for recording the packed video and audio data is secured, the packed video and audio data buffer control block 42 records the packed video and audio data D2 to this recording area (step S74). Next, the packed video and audio data buffer control block 42 transfers information such as the recording position on the recording medium, data length and abstract video and audio data reproduction start time of the packed video and audio data D2 to the packed video and audio data management table control block 43 (step S75). The information such as the recording position, data length and abstract video and audio data reproduction start time of the packed video and audio data is information to be recorded on the sequence table. These data are hereinafter referred to as management data.

The packed video and audio data management table control processing will now be described with reference to FIG. 13. The packed video and audio data management table control processing is the processing to prepare the packed video and audio data management table of the packed video and audio data. The packed video and audio data management table control block 43 checks whether or not there is a free space in the recording area that has already been allocated from the recording medium control block 10*d* (step S81). If it is judged that there is no free space in the already acquired recording area (NO at step S81), the packed video and audio data management table control block 43 records the existing packed video and audio data management table to the already allocated recording area (step S82). Then, the packed video and audio data management table control block 43 requests the recording medium control block 10*d* to provide a recording area for recording a new packed video and audio data management table (step S83).

When a recording position for recording a new packed video and audio data management table is outputted from the recording medium control block 10*d*, the packed video and audio data management table control block 43 transfers this recording position and the packed video data and audio data D2 to the recording medium management table control block 44 (step S84).

When a recording area for recording the packed video and audio data management table is secured, the packed video and audio data management table control block 43 judges whether packed video and audio data to be newly recorded exists or not (step S85). If there is no packed video and audio data to be newly recorded (NO at step S85), the packed video and audio data management table control block 43 waits for input of packed video and audio data to be newly recorded.

On the other hand, there is the packed video and audio data D2 to be newly recorded (YES at step S85), the packed video and audio data management table control block 43 acquires this packed video and audio data D2 and the management data (step S86). The packed video and audio data management table control block 43 adds the acquired packed video and audio data D2 and management data to the packed video and audio data management table (step S87).

The recording medium management table control processing will now be described with reference to FIG. 14. The recording medium management table control processing is the processing carried out by the recording medium management table control block 44. The recording medium management table control block 44 checks whether or not there is a free space for adding the recording medium management table D5 in the recording area that has already been allocated from the recording medium control block 10*d* (step S91). If it is judged that there is no free space in the already acquired recording area (NO at step S91), the recording medium management table control block 44 records the existing recording medium management table D5 in the already allocated recording area (step S92). The recording medium management table control block 44 requests for a recording area for recording a new packed video and audio data management table (step S93).

As the recording medium control block 10*d* secures a recording area for recording the recording medium management table D5, the recording medium control block 10*d* outputs position information of this recording area to the recording medium management table control block 44. After receiving the recording position information from the recording medium control block 10*d*, the recording medium management table control block 44 judges whether or not there is the packed video and audio data D2 to be newly recorded (step S94). If there is no packed video and audio data D2 to be newly recorded (NO at step S94), the recording medium management table control block 44 waits for input of the packed video and audio data D2 to be newly recorded (step S94).

On the other hand, if there is the packed video and audio data D2 to be newly recorded (YES at step S94), the recording medium management table control block 44 acquires this packed video and audio data D2 and the recording position information of the recording medium management table D5 (step S95). The recording medium management table control block 44 adds the acquired packed video and audio data D2 and recording position information of the recording medium management table D5 to the content information (step S96).

The recording medium control block 10d is a block for allocating a recording area on the recording medium in response to a request from the packed video and audio data management control block 10c and writing recording video and audio data to the allocated recording area. In the recording apparatus and the recording method according to the present invention, the recording medium to be used is not limited and therefore a measure to abstract the recording medium is provided.

Figure 15:
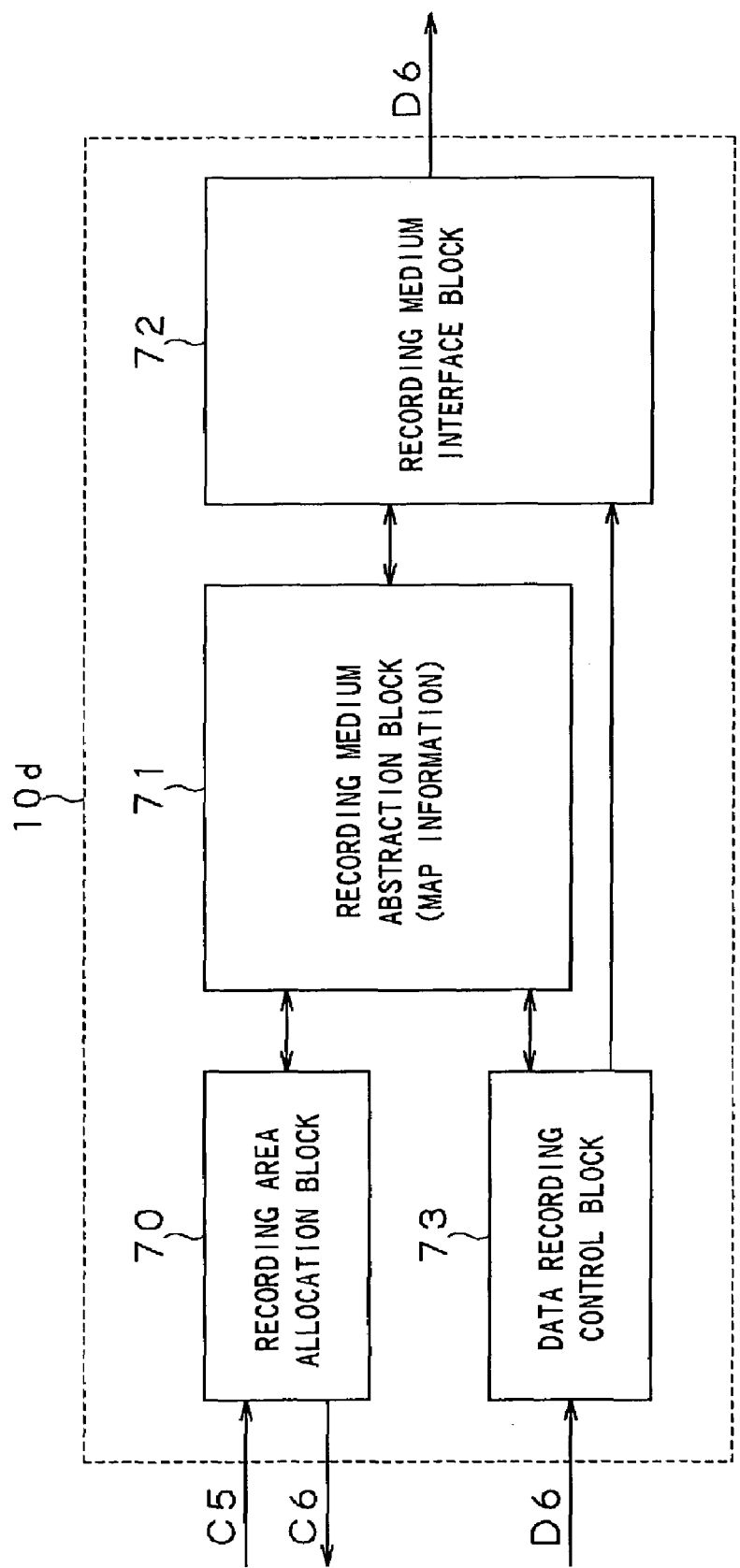
FIG. 15 is a block diagram showing an internal structure of a recording medium control block at the time of recording.

FIG. 15 shows an internal structure of the recording medium control block 10d. The recording medium control block 10d has a recording area allocation block 70 for receiving a recording area allocation request, a recording medium abstraction block 71 for allocating a recording area by abstract unit, a recording medium interface block 72 as an interface dedicated to the recording medium, and a data recording control block 73 for converting the recording data D6 to a recording area designation method suitable for the recording medium.

Before recording of the packed video and audio data D2 or the related management table from the packed video and audio data management control block 10c, the packed video and audio data management control block 10c issues a recording area allocation request to the recording medium control block 10d. This request is received by the recording area allocation block 70. After receiving the recording area allocation request, the recording area allocation block 70 accesses the recording medium abstraction block 71 to allocate a recording area by "abstract unit".

The recording medium abstraction block 71 allocates a recording area in a format that is not dependent on the recording medium. For example, when a hard disk or an optical disc is used as the recording medium, the minimum unit of recording is a sector. When a semiconductor memory is used as the recording medium, the minimum unit of recording is a byte. Even when the minimum unit of recording is a sector, the sector size (number of bytes) differs between a hard disk and an optical disc. A measure to deal with such differences in recording area designation method depending on the recording medium is incorporated in the recording medium abstraction block 71.

The recording medium abstraction block 71 holds map information describing the relation between the actual recording medium and the abstracted recording area. In response to the recording area allocation request from the packed video and audio data management control block 10c, the recording area allocation block 70 allocates a recording area with reference to the map information in the recording medium abstraction block 71. Generally, since the size of a recording area that can be allocated at a time is not necessarily constant, the response to allocate a recording area includes its size. FIG. 16 shows an exemplary map. SDA (storage data area) of FIG. 16 is equivalent to an abstracted recording area. In response to the recording area allocation request from the packed video and audio data management control block 10c, the recording area allocation block 70 notifies of an unused SDA area and its size.

The packed video and audio data management control block 10c arranges the recording area for the management table and the packed video and audio data D2 in accordance with the allocated SDA number and its size. When the data to fill the allocated recording area is prepared, the packed video and audio data management control block 10c outputs the recording data D6 the recording medium control block 10d.

The recording data D6 includes information of which recording area (SDA number) is used for recording. The recording area has been allocated by the recording medium control block 10d.

The recording data D6 outputted from the packed video and audio data management control block 10c is inputted to the data recording control block 73. The data recording control block 73 buffers the data to be recorded, when necessary. At the same time, the data recording control block 73 converts the recording area designated in the SDA format using the map information in the recording medium abstraction block 71 to a recording area designation method suitable for the actual recording medium and ultimately outputs the recording data D6 to the recording medium interface block 72.

The recording medium interface block 72 is an interface dedicated to the recording medium to which the present invention is applied. The recording medium interface block 72 actually write the recording data D6 to the recording medium.

By not only statically preparing map information in the recording medium abstraction block 71 but also interrelating the recording medium abstraction block 71 with the recording medium interface block 72, it is possible to provide a measure to dynamically generate map information in accordance with the connected recording medium.

In this manner, the recording medium control block 10d is a block in charge of data recording to the actual recording medium. As the recording area designation method proper to the recording medium is abstracted, the recording medium control block 10d can monistically handle the management table related to the video and audio data generated in the packed video and audio data management control block 10c.

A video and audio data reproducing apparatus according to the present invention will now be described with reference to the drawings.

Figure 17:
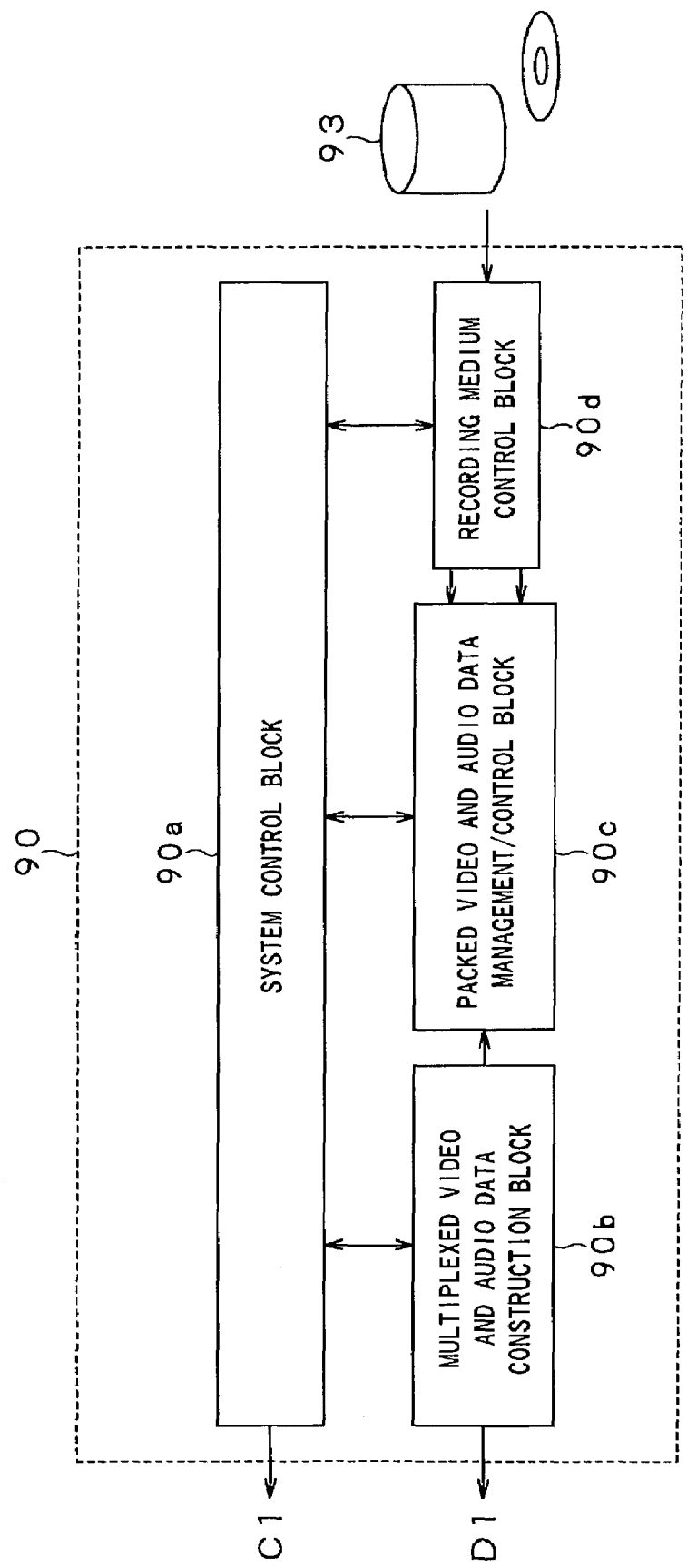
FIG. 17 is a block diagram showing an overall structure of a video and audio data reproducing apparatus.

FIG. 17 is a block structural view of a video and audio data reproducing apparatus 90. The video and audio data reproducing apparatus 90 has a system control block 90a for controlling the entire blocks constituting the video and audio data reproducing apparatus 90, a multiplexed video and audio data construction block 90b for reconstructing packed video and audio data D2, a packed video and audio data management control block 90c for managing reading of video and audio data, and a recording medium control block 90d as an interface with a recording medium 93.

In the video and audio data reproducing apparatus 90, reproduction is started and video and audio data to be reproduced is designated by an external command C1. The external command C1 in this case includes a reproduction start command including designation of video and audio data to be reproduced, its reproducing method for the data (normal reproduction, fast forward or the like), and its multiplexing method. The video and audio data is a video and audio content reproduced by the video and audio reproducing apparatus according to the present invention.

The external command C1 is inputted to the system control block 90a of the video and audio data reproducing apparatus 90. The system control block 90a is, for example, an MPU for controlling the video and audio data reproducing apparatus as a whole. After receiving a reproduction start command from outside, the system control block 90a instructs the packed video and audio data management control block 90c to reproduce the designated video and audio content.

Figure 18:
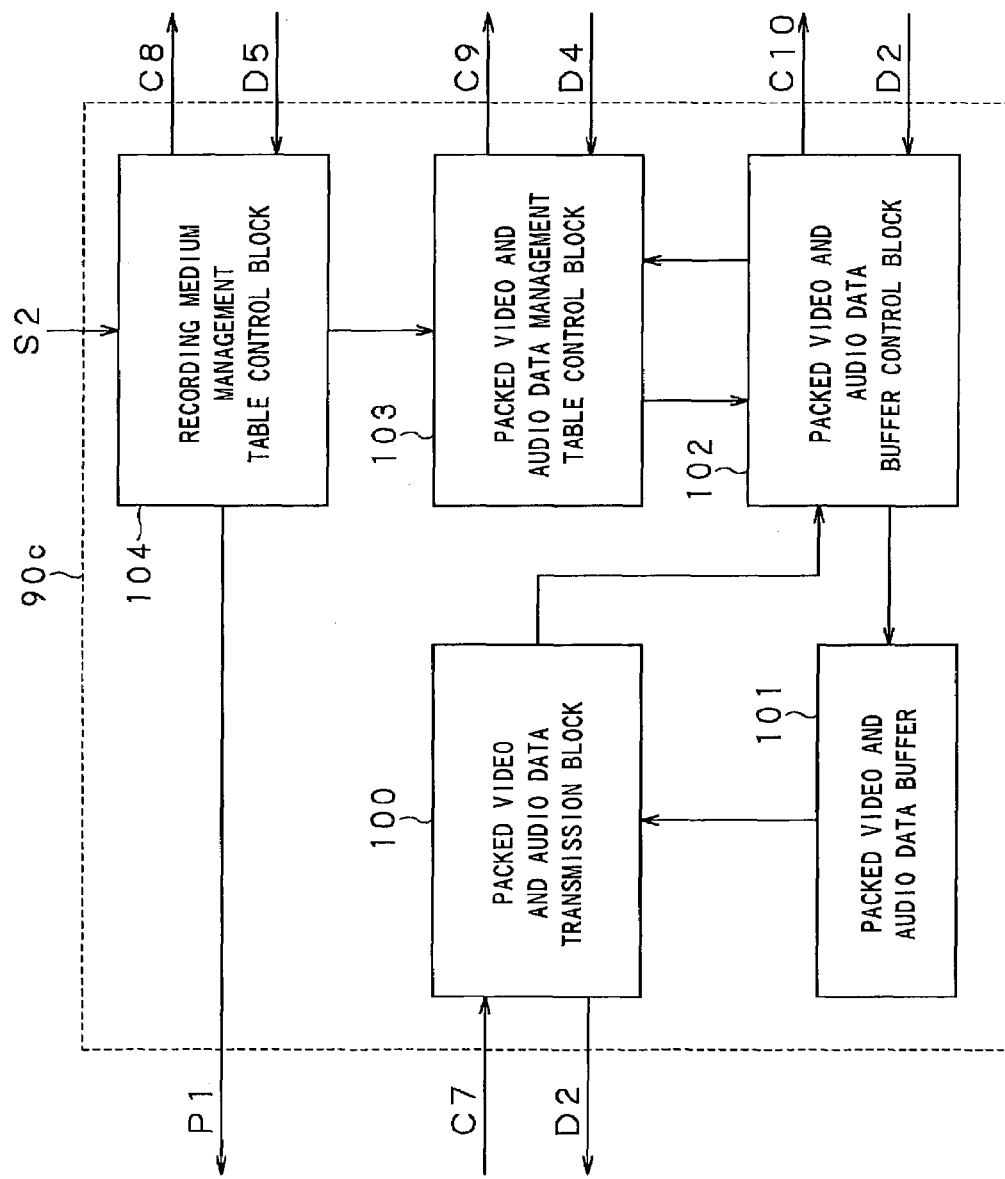
FIG. 18 is a block diagram showing an internal structure of a packed video and audio data management control block at the time of reproduction.

FIG. 18 shows the details of an internal structure of the packed video and audio data management control block 90c. A video and audio content designation from the packed video and audio data management control block 90c is inputted to a recording medium management table control block 104. The recording medium management table control block 104 inputs a designation S1 of video and audio content and first reads out a recording medium management table D5 in order to calculate a recording area for the designated video and audio content. An example of the recording medium management table D5 is as shown in FIG. 6. This table is generated when recording a video and audio source D1. A read-out request C8 for the recording medium management table D5 is implemented by designating a recording area for the recording medium management table D5 to the recording medium control block 90d. Since there is no index for designation of the recording area for the recording medium management table D5, a prescribed (fixed) SDA number area is allocated.

Since the recording medium management table D5 is necessarily updated or referred to at the time of recording and reproduction, the recording medium management table D5 can be read out in advance when the present reproducing apparatus is started (i.e., at the time of initialization), thus realizing more efficient processing.

In any case, the recording position of the packed video and audio data management table for the target (designated) video and audio content is led out with reference to the recording medium management table D5.

The recording position information of the packed video and audio data management table, thus calculated, is transmitted to a packed video and audio data management table control block 103. The packed video and audio data management table control block 103 reads out a packed video and audio management table. A read-out request C9 for a packed video and audio data management table D4 is implemented by designating a recording area for the packed video and audio data management table D4 to the recording medium control block 90d. An example of the packed video and audio data management table is as shown in FIG. 10.

A transfer request C10 for the packed video and audio data D2 is issued by the multiplexed video and audio data construction block 90b. This request C10 includes information indicating which packed video and audio data D2 should be read out, for example, packed video and audio data number or reproduction lapse time.

This transfer request C10 for the packed video and audio data D2 is inputted to a packed video and audio data transmission block 100. As this request is received, the packed video and audio data transmission block 100 designates the packed video and audio data D2 to be read out and requests reading of the designated packed video and audio data D2. A packed video and audio data buffer control block 102 reads out the designated packed video and audio data D2 on the basis of information described in the packed video and audio data management table read out in advance, and inputs the read-out packed video and audio data D2 to a packed video and audio data buffer 101. Reading of the packed video and audio data D2 is implemented by designating a recording area for the packed video and audio data D2 to the recording medium control block 90d.

The designated packed video and audio data D2 stored in the packed video and audio data buffer 101 is outputted to the multiplexed video and audio data construction block 90d, which is the request source, via the packed video and audio transmission block 100. The multiplexed video and audio data construction block 90d refers to a video and audio data attribute P described in the recording medium management table D5 when reconstructing timing information of video and audio data to be multiplexed.

In this manner, the management control block 90c for the packed video and audio data D2 can monistically manage and control reading of video and audio data in a format that is not dependent on the video format and audio format.

In the above description, reading of the management table and reading of the packed video and audio data are described. The recording medium control block 90d as an interface with the actual recording medium will now be described.

The recording medium control block 90d is a block for executing reading of recorded video and audio data from a designated recording area on a recording medium in response to a request from the packed video and audio data management control block 90c. Similar to the recording medium control block 10d (FIG. 15) described in the description of the recording apparatus, the recording medium control block 90d has a measure to abstract a recording medium since the recording medium is not limited in the reproducing apparatus and the reproducing method according to the present invention.

Figure 19:
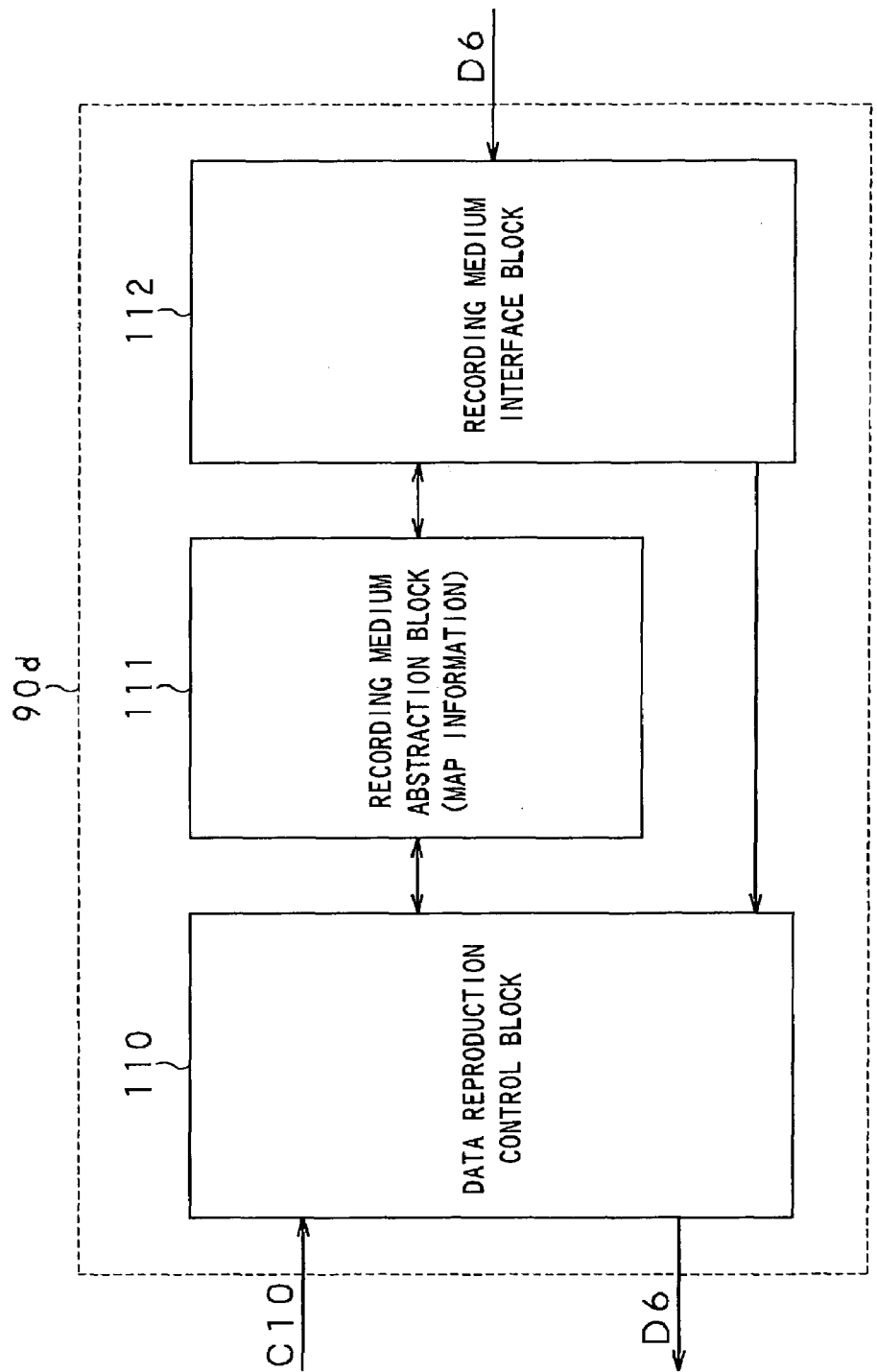
FIG. 19 is a block diagram showing an internal structure of a recording medium control block at the time of reproduction.

FIG. 19 shows an internal structure of the recording medium control block 90d. The packed video and audio data management control block 90c issues a recorded data read-out request C11 to the recording medium control block 90d. This request is received by a data reproduction control block 110. When the recorded data read-out request C11 is received, the data reproduction control block 110 accesses a recording medium abstraction block 111 and a designated read-out area (abstracted read-out position information) is converted to a unit of the recording medium that is actually used.

The recording medium abstraction block 111 holds map information describing the relation between the actual recording medium and the abstracted recording area. In response to the recorded data read-out request C11 from the packed video and audio data management control block 90c, the data reproduction control block 110 converts designated read-out area information to a unit of the actual recording medium with reference to the map information in the recording medium abstraction block 111. FIG. 16 shows an exemplary map. SDA (storage data area) of FIG. 16 is equivalent to an abstracted recording area. In response to the recorded data read-out request C11 (in which the read-out area is designated by the SDA number) from the packed video and audio data management control block 90c, the data reproduction control block 110 reads out desired recorded data D6 via a recording medium interface block 112, converting the data to a unit of the actual recording medium.

The recording medium interface block 112 is an interface dedicated to the recording medium to which the present invention is applied. The recording medium interface block 112 reads out the recorded data D6 from the actual recording medium. The read-out recorded data D6 is outputted to the packed video and audio data management control block 90c, which is the request source, via the data reproduction control block 110.

In this manner, the recording medium control block 90d is a block in charge of reading out the recorded data D6 from the actual recording medium. The recording medium control block 90d has a measure to abstract the recording area designation method proper to the recording medium.

Figure 20:
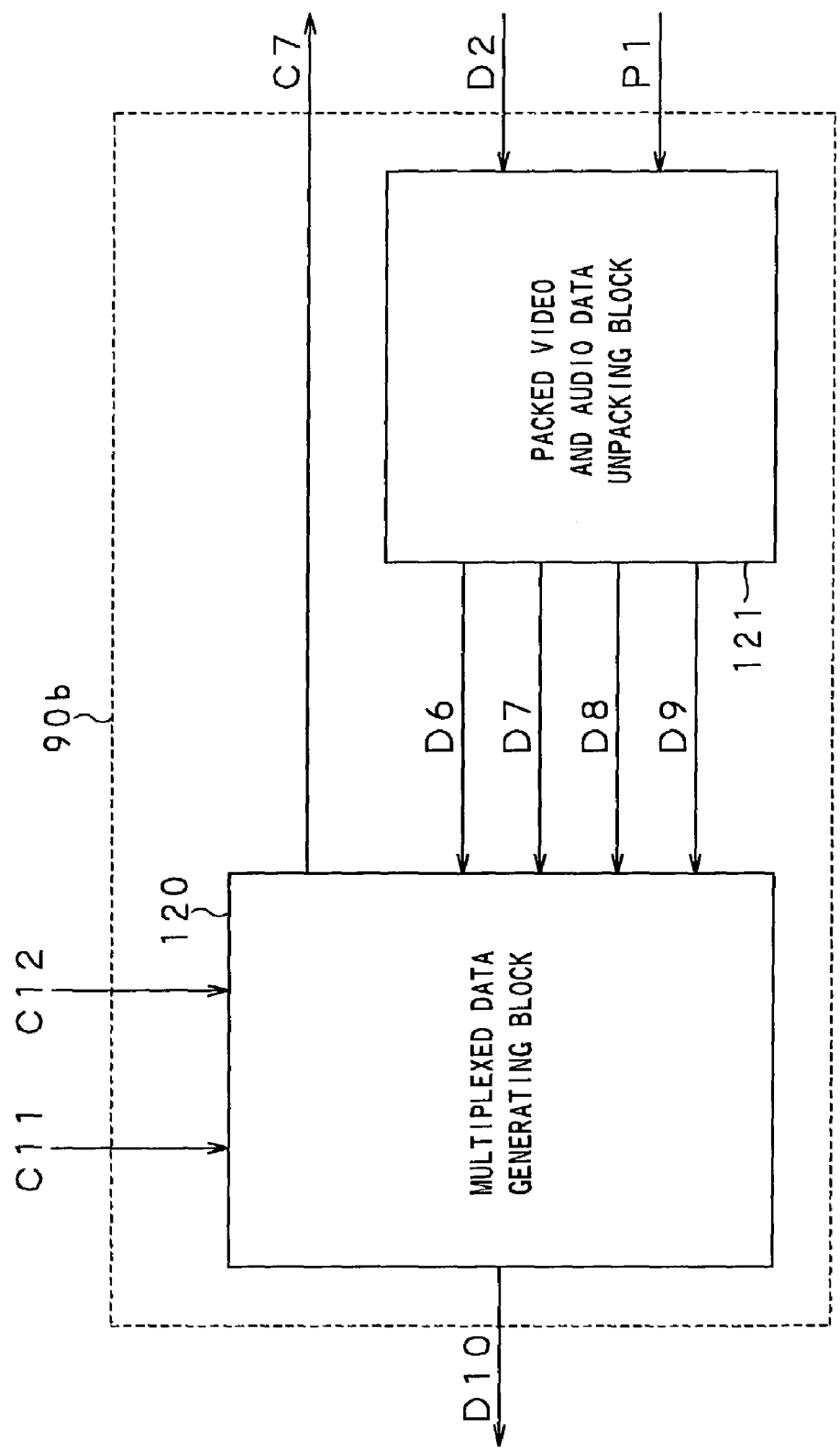
FIG. 20 is a block diagram showing an internal structure of a multiplexed video and audio data construction block at the time of reproduction.

Finally, the multiplexed video and audio data construction block 90b will be described. FIG. 20 shows an internal structure of the recording medium control block 90b. A reproducing method C12 for the video and audio content designated by the external command C1 is designated. This reproducing method C12 is transmitted to a packed video and audio data D2 read-out control block in the multiplexed video and audio data construction block 90b via the system control block 90a.

The packed video and audio data D2 read-out control block functions to read out desired packed video and audio data D2 to the packed video and audio data management control block 90c on the basis of the designated reproducing method.

First, normal reproduction will be described. In the case of normal reproduction, the packed video and audio data D2 may be read out in order from the leading end of the designated video and audio content. Therefore, the packed video and audio data management control block 90c is first requested to transfer the leading packed video and audio number (packed video and audio number 1, see FIG. 9). The packed video and audio data management control block 90c reads out the requested packed video and audio data D2 from the recording medium in accordance with the packed video and audio data management table, and outputs the data to the multiplexed video and audio data construction block 90b.

The designated packed video and audio data D2 is inputted to a packed video and audio data unpacking block 121 in the multiplexed video and audio data construction block 90b. The packed video and audio data unpacking block 121 separates the packed video and audio data D2 shown in FIG. 6 into a video part and an audio part, and reconstructs reproducing time information or time stamp for each of the video part and the audio part. To reconstruct the time stamp, a video and audio data attribute P1 in a recording medium management table D5 managed in the packed video and audio data management control block 90b is used. The video data, audio data and their reproducing time information, thus obtained, are outputted to a multiplexed data generating block 120.

The multiplexed data generating block 120 reconstructs video and audio data multiplexed in accordance with a system conformable to the multiplexing format designated by the external command C1, from the received video data, audio data and their time information. Since the measure to reconstruct the multiplexing format is provided as described above, an ultimate output stream may be outputted in a multiplexing format that is different from a multiplexing format inputted at the time of recording, if possible.

On completion of output of one packed video and audio data D2, a transfer request C2 for the next packed video and audio data D2 is issued to the packed video and audio data management control block 90c in order to start processing the next packed video and audio data D2. The subsequent packed video and audio data are sequentially processed in accordance with similar procedures.

Special reproduction will now be described. Special reproduction starts with the state where reproduction of the first designated video and audio contents has already been started in the normal reproduction mode. Special reproduction is designated by an external command as one of reproducing methods via the system control block 90a. The multiplexed data generating block 120 is notified of this designation. Since the multiplexed data generating block 120 knows the position that is currently being reproduced, the multiplexed data generating block 120 can judge which packed video and audio data D2 should be read out to realize the designated special reproduction, on the basis of the type and speed of the designated special reproduction. As a result of this judgment, the multiplexed data generating block 120 requests the packed video and audio data management control block 90c to provide necessary packed video and audio data D2. For example, the multiplexed data generating block 120 designated the packed video and audio data D2 by designating a time difference value from a time point very close to the completion of multiplexing. Alternatively, a desired time itself, a packed video and audio data number itself, or a packed video and audio data number difference value may be designated. In any case, the packed video and audio data transmission block 100 in the packed video and audio data management control block 90c refers to the target packed video and audio data management table and selects the packed video and audio data D2 that is ultimately appropriate. In the case of designating a time or a time difference value, there may not be packed video and audio data D2 that is accurately equivalent to that time. In such a case, a certain measure must be taken, such as selecting packed video and audio data D2 of the closest time.

By sequentially reading out the packed video and audio data D2 as described above, it is possible to acquire video and audio data for special reproduction of each packed video and audio data.

The packed video and audio data thus acquired may be multiplexed in the multiplexed data generating block 120 and outputted as ultimate multiplexed video and audio data, as in the case of normal reproduction. However, it is possible to realize more advanced special reproduction by adjusting the processing in the multiplexed data generating block 120. An MPEG-2 transport stream is now considered as an example. A decoding unit of MPEG-2 video data is a GOP, as described above. In the case where packed video and audio data D2 is constructed using a GOP as a unit, I-, P- and B-frames exist as frames included in the video data. In the case of realizing special reproduction at a speed less than a frame included in one packed video and audio data D2, for example, in the case of reproducing only an I-frame and a P-frame of packed video and audio data D2 containing 15 frames, an output for special reproduction can be constructed in the present reproducing apparatus by extracting only the I-frame and the P-frame and performing multiplexing with the time adjusted. As the output for special reproduction is thus generated in the present reproducing apparatus, a medium which receives the output, for example, a decoder need not perform any processing for realizing special reproduction.

While this invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

What is claimed is:

1. A video and audio data recording apparatus for recording on a recording medium a video and audio source having a multiplexing format, the apparatus comprising:

recording starting means for starting the recording of the video and audio source in response to a command identifying the multiplexing format of said video and audio source;

signal separating means for separating video data, audio data and video and audio data synchronizing information included in said multiplexed data in accordance with said identified multiplexing format;

video abstract data generating means for generating data of an abstracted video format from the separated video data;

audio abstract data generating means for generating data of an abstracted audio format from the separated audio data;

packing means for packing the abstracted video and audio data independent of the multiplexing format of said video and audio source;

data management table generating means for generating from the packed video and audio data and from the video and audio data synchronizing information a data management table for managing the packed video and audio data and the video and audio data synchronizing information, said data management table including size, reproduction start time and identification of the location on said medium of said packed video and audio data;

recording medium management table generating means for generating a recording medium management table for identifying each video and audio source to be recorded on a said recording medium; and recording means for recording as a group the packed video and audio data and the data and recording medium management tables.

2. The video and audio data recording apparatus as claimed in claim 1, wherein a multiplexing format, a video format and an audio format of video and audio data to be inputted are changeable, and wherein plural formats are supported simultaneously.

3. The video and audio data recording apparatus as claimed in claim 1, wherein the video and audio source is comprised of both video and audio data, video data only, or audio data.

4. The video and audio data recording apparatus as claimed in claim 1, wherein the packing means packs the video and audio data using, as a reference, an integral multiple of a decoding unit of the video data or an integral multiple of a decoding unit of the audio data.

5. The video and audio data recording apparatus as claimed in claim 1, wherein the recording means monistically records the packed, abstracted video and audio data.

6. The video and audio data recording apparatus as claimed in claim 1, wherein the recording medium management table includes an attribute of the video and audio source.

7. The video and audio data recording apparatus as claimed in claim 1, wherein the recording medium management table is generated in accordance with an abstracted recording medium, and the video and audio data recording apparatus is operable to record on all recording media having random accessibility.

8. A video and audio data recording method for recording on a recording medium a video and audio source having a multiplexing format, the method comprising:

starting the recording of the video and audio source in response to a command identifying the multiplexing format of said video and audio source;

separating video data, audio data and video and audio data synchronizing information included in said multiplexed data in accordance with said identified multiplexing format;

generating data of an abstracted video format from the separated video data;

generating data of an abstracted audio format from the separated audio data;

packing the abstracted video and audio data independent of the multiplexing format of said video and audio source;

generating from the packed video and audio data and from the video and audio data synchronizing information a data management table for managing the packed video and audio data and the video and audio data synchronizing information, said data management table including size, reproduction start time and identification of the location on said medium of said packed video and audio data;

generating a recording medium management table for identifying each video and audio source to be recorded on said recording medium; and recording as a group the packed video and audio data and the data and recording medium management tables.

9. The video and audio data recording method as claimed in claim 8, wherein a multiplexing format, a video format and an audio format of video and audio data to be inputted are changeable, and wherein plural formats are supported simultaneously.

10. The video and audio data recording method as claimed in claim 8, wherein the video and audio source is comprised of both video and audio data, video data only, or audio data.

11. The video and audio data recording method as claimed in claim 8 wherein the abstracted video and audio data are packed using, as a reference, an integral multiple of a decoding unit of the video data or an integral multiple of a decoding unit of the audio data.

12. The video and audio data recording method as claimed in claim 8, wherein the recording medium management table includes an attribute of the video and audio source.

13. The video and audio data recording method as claimed in claim 8, wherein the recording medium management table is generated in accordance with an abstracted recording medium and, the video and audio data recording method is operable to all recording media having random accessibility.

14. A video and audio data reproducing apparatus for reproducing video and audio content from a recording medium, said video and audio content having been supplied for recording on the recording medium in a source multiplexing format, said reproducing apparatus comprising:

selecting means for identifying a selected video and audio content to be reproduced;

reproducing method designating means for designating a reproducing method for the selected video and audio content;

multiplexing format designating means responsive to an external command for designating a multiplexing format for the selected video and audio content, said designated multiplexing format not being constrained by said source multiplexing format;

recording medium management table acquiring means for reading out a recording medium management table having stored therein a presenting time for video and audio data of the selected content and a recording position on said recording medium of a data management table, said data management table having stored therein a position on said recording medium where packed video and audio data is stored, the size of the packed video and audio data, and video and audio data attribute information;

data management table acquiring means for reading out the data management table for the video and audio content in accordance with the recording position of the data management table stored in the recording medium management table;

packed data acquiring means for sequentially reading out the packed video and audio data from the recording medium position stored in said data management table in accordance with said designated reproducing method;

unpacking means for unpacking and separating the read-out packed video and audio data using the video and audio data attribute information in the data management table; and multiplexed data generating means for multiplexing the separated video and audio data into a format conformable to the designated reproducing method and the designated multiplexing format.

15. The video and audio data reproducing apparatus as claimed in claim 14, wherein the packed data acquiring means monistically reads out the packed video and audio data in accordance with the video and audio content reproducing method designated from the data management table, independent of the format of the video and audio data from a source thereof before recording.

16. The video and audio data reproducing apparatus as claimed in claim 14, wherein the packed data acquiring means performs special reproduction speed in accordance with the video and audio content reproducing method read out from the data management table.

17. A video and audio data reproducing method for reproducing video and audio content from a recording medium, said video and audio content having been supplied for recording on the recording medium in a source multiplexing format, said method comprising:

identifying a selected video and audio content to be reproduced;

designating a reproducing method for the selected video and audio content;

designating, in response to an external command, a multiplexing format for the selected video and audio content, said designated multiplexing format not being constrained by said source multiplexing format;

reading out a recording medium management table having stored therein a presenting time for video and audio data of the selected content and a recording position on said recording medium of a data management table, said data management table having stored therein a position on said recording medium where packed video and audio data is stored, the size of the packed video and audio data, and video and audio data attribute information;

sequentially reading out the packed video and audio data from the recording medium position stored in the data management table;

unpacking and separating the read-out packed video and audio data using the video and audio data attribute information in the data management table; and multiplexing the separated video and audio data into a format conformable to the designated reproducing method and the designated multiplexing format.

18. The video and audio data reproducing method as claimed in claim 17, wherein the data management table is monistic and independent of the format of the video and audio data from a source thereof before recording.

19. The video and audio data reproducing method as claimed in claim 17, wherein the packed video and audio data is read out at a special reproduction speed in accordance with the video and audio content reproducing method read out from the data management table.

\* \* \* \* \*